(12) United States Patent
Boulet et al.

(10) Patent No.: US 10,315,159 B2
(45) Date of Patent: Jun. 11, 2019

(54) METHOD OF ADSORPTIVE GAS SEPARATION USING THERMALLY CONDUCTIVE CONTACTOR STRUCTURE

(71) Applicant: INVENTYS THERMAL TECHNOLOGIES INC., Burnaby (CA)

(72) Inventors: Andre Boulet, Bowen Island (CA); Soheil Khiavi, North Vancouver (CA)

(73) Assignee: INVENTYS THERMAL TECHNOOGIES INC., Vancouver, BC (CA)

( * ) Notice: Subject to any disclaimer, the term of this patent is extended or adjusted under 35 U.S.C. 154(b) by 0 days.

(21) Appl. No.: 15/395,932

(22) Filed: Dec. 30, 2016

(65) Prior Publication Data

US 2017/0106336 A1 Apr. 20, 2017

Related U.S. Application Data

(63) Continuation-in-part of application No. 14/543,765, filed on Nov. 17, 2014, now Pat. No. 9,533,252,
(Continued)

(51) Int. Cl.
*B01D 53/04* (2006.01)
*B01D 53/34* (2006.01)
(Continued)

(52) U.S. Cl.
CPC ........... *B01D 53/343* (2013.01); *B01D 53/04* (2013.01); *B01D 53/0454* (2013.01);
(Continued)

(58) Field of Classification Search
CPC .......................... B01D 53/04; B01D 53/0454; B01D 53/0462; B01D 53/52; B01D 53/62
(Continued)

(56) References Cited

U.S. PATENT DOCUMENTS 2,989,383 A 6/1961 Miller
3,713,281 A 1/1973 Asker et al.
(Continued)

FOREIGN PATENT DOCUMENTS

EP 0578371 A1 1/1994
EP 1080773 A1 3/2001
(Continued)

OTHER PUBLICATIONS

Menard D et al: "Activated carbon monolith of high thermal conductivity for adsorption processes improvement", Chemical Engineering and Processing, Sep. 1, 2005, pp. 1029-1038, vo 1. 44, No. 9, Elsevier Sequoia, Lausanne.
(Continued)

*Primary Examiner* — Robert A Hopkins
(74) *Attorney, Agent, or Firm* — Palmer IP Inc.

(57) ABSTRACT

A method of adsorption allows separation of a first fluid component from a fluid mixture comprising at least the first fluid component in an adsorptive separation system having a parallel passage adsorbent contactor with parallel flow passages having cell walls which include an adsorbent material. The method provides for transferring heat from the heat of adsorption in a countercurrent direction along at least a portion of the contactor during adsorption and transferring heat in either axial direction along the contactor and/or a direction transverse to the axial direction, to provide at least a portion of the heat of desorption during a desorption step. A carbon dioxide separation process to separate carbon dioxide from flue gas also includes steps transferring heat from adsorption or for desorption along the parallel passage adsorbent contactor.

21 Claims, 6 Drawing Sheets

Related U.S. Application Data which is a continuation of application No. 13/819,319, filed as application No. PCT/CA2011/050521 on Aug. 26, 2011, now Pat. No. 8,900,347.

(60) Provisional application No. 61/377,875, filed on Aug. 27, 2010.

(51) Int. Cl.
*B01D 53/62* (2006.01)
*B01D 53/52* (2006.01)
*C10L 3/10* (2006.01)

(52) U.S. Cl.
CPC ......... *B01D 53/0462* (2013.01); *B01D 53/52* (2013.01); *B01D 53/62* (2013.01); *C10L 3/103* (2013.01); *C10L 3/104* (2013.01); *B01D 2253/102* (2013.01); *B01D 2253/104* (2013.01); *B01D 2253/108* (2013.01); *B01D 2253/116* (2013.01); *B01D 2253/202* (2013.01); *B01D 2253/204* (2013.01); *B01D 2253/3425* (2013.01); *B01D 2256/245* (2013.01); *B01D 2257/302* (2013.01); *B01D 2257/304* (2013.01); *B01D 2257/40* (2013.01); *B01D 2257/504* (2013.01); *B01D 2257/60* (2013.01); *B01D 2257/80* (2013.01); *B01D 2258/0283* (2013.01); *C10L 2290/543* (2013.01); *Y02C 10/04* (2013.01); *Y02C 10/08* (2013.01)

(58) Field of Classification Search
USPC ............ 96/143, 144, 146; 95/136, 139, 148
See application file for complete search history.

(56) References Cited

U.S. PATENT DOCUMENTS

| | | |
|---|---|---|
| 4,707,167 A | 11/1987 | Saito et al. |
| 4,872,889 A | 10/1989 | Lepperhoff et al. |
| 4,971,605 A | 11/1990 | Tarman |
| 5,232,882 A | 8/1993 | Yoshimoto et al. |
| 5,259,190 A | 11/1993 | Bagley et al. |
| 5,338,450 A | 8/1994 | Maurer |
| 5,388,637 A | 2/1995 | Jones et al. |
| 5,393,586 A | 2/1995 | Lipp |
| 5,505,825 A | 4/1996 | Gold et al. |
| 5,562,885 A | 10/1996 | Bayer et al. |
| 5,569,455 A | 10/1996 | Fukui et al. |
| 5,628,819 A | 5/1997 | Mestemaker et al. |
| 5,667,713 A | 9/1997 | Kuma |
| 5,750,026 A | 5/1998 | Gadkaree et al. |
| 5,827,355 A | 10/1998 | Wilson et al. |
| 5,948,142 A | 9/1999 | Holmes et al. |
| 5,972,077 A | 10/1999 | Judkins et al. |
| 6,097,011 A | 8/2000 | Gadkaree et al. |
| 6,197,097 B1 | 3/2001 | Ertl et al. |
| 6,287,524 B1 | 9/2001 | Hums et al. |
| 6,364,936 B1 | 4/2002 | Rood et al. |
| 6,375,716 B1 | 4/2002 | Burchell et al. |
| 6,402,809 B1 | 6/2002 | Monereau et al. |
| 6,521,026 B1 | 2/2003 | Goto |
| 6,652,627 B1 | 11/2003 | Tonkovich et al. |
| 6,964,695 B2 | 11/2005 | Place et al. |
| 7,083,663 B2 | 8/2006 | Shih et al. |
| 7,141,092 B1 | 11/2006 | Roychoudhury et al. |
| 7,317,871 B2 | 1/2008 | Tennison et al. |
| 7,645,324 B2 | 1/2010 | Rode et al. |
| 7,938,886 B2 | 5/2011 | Hershkowitz et al. |
| 7,947,120 B2 | 5/2011 | Deckman et al. |
| 7,959,720 B2 | 6/2011 | Deckman et al. |
| 8,052,783 B2 | 11/2011 | Baker |
| 8,715,394 B2 | 5/2014 | Caram et al. |
| 8,747,528 B2 | 6/2014 | Hung et al. |
| 8,900,347 B2 | 12/2014 | Boulet et al. |
| 8,940,072 B2 | 1/2015 | Boulet et al. |
| 2003/0209149 A1 | 11/2003 | Myasnikov et al. |
| 2004/0057880 A1 | 3/2004 | Treutter et al. |
| 2004/0206061 A1 | 10/2004 | Ichikawa |
| 2005/0095188 A1 | 5/2005 | Matsumoto et al. |
| 2005/0199123 A1 | 9/2005 | Schmidt et al. |
| 2006/0225569 A1 | 10/2006 | Schmidt et al. |
| 2008/0141638 A1 | 6/2008 | Linhart et al. |
| 2008/0155950 A1 | 7/2008 | Blackwell et al. |
| 2008/0237131 A1 | 10/2008 | Brown et al. |
| 2008/0282885 A1 | 11/2008 | Deckman et al. |
| 2008/0282886 A1 | 11/2008 | Reyes et al. |
| 2008/0282892 A1 | 11/2008 | Deckman et al. |
| 2009/0326279 A1 | 12/2009 | Tonkovich et al. |
| 2010/0035751 A1 | 2/2010 | Perera et al. |
| 2010/0043633 A1 | 2/2010 | Galbraith |
| 2010/0212495 A1 | 8/2010 | Gadkaree et al. |
| 2010/0242728 A1 | 9/2010 | Radosz et al. |
| 2011/0311761 A1 | 12/2011 | Boulet et al. |
| 2012/0125194 A1 | 5/2012 | Caram |
| 2012/0222551 A1 | 9/2012 | Deckman |

FOREIGN PATENT DOCUMENTS

| | | | |
|---|---|---|---|
| EP | 1375851 A1 | 1/2004 | |
| EP | 1574246 A1 | 9/2005 | |
| EP | 1710008 A1 | 10/2006 | |
| EP | 1933970 A1 | 6/2008 | |
| JP | 2006187767 A | * 7/2006 | ............ B01D 53/44 |
| JP | 2006187767 A | 7/2006 | |
| WO | 2006127889 A2 | 11/2006 | |
| WO | 2007043863 A1 | 4/2007 | |
| WO | 2008143823 A1 | 11/2008 | |
| WO | 2008143825 A1 | 11/2008 | |
| WO | 2008143826 A1 | 11/2008 | |
| WO | 2008143968 A1 | 11/2008 | |
| WO | 2008147676 A1 | 12/2008 | |
| WO | 2009036247 A1 | 3/2009 | |
| WO | 2009092784 A2 | 7/2009 | |
| WO | 2010096916 A1 | 9/2010 | |
| WO | 2010099208 A2 | 9/2010 | |
| WO | 2012118748 A1 | 9/2012 | |

OTHER PUBLICATIONS

Douglas Ruthven: "Principles of adsorption and adsorption processes", Principles of Adsorption and Adsorption Processes, Jan. 1, 1984, pp. 342-347.

* cited by examiner

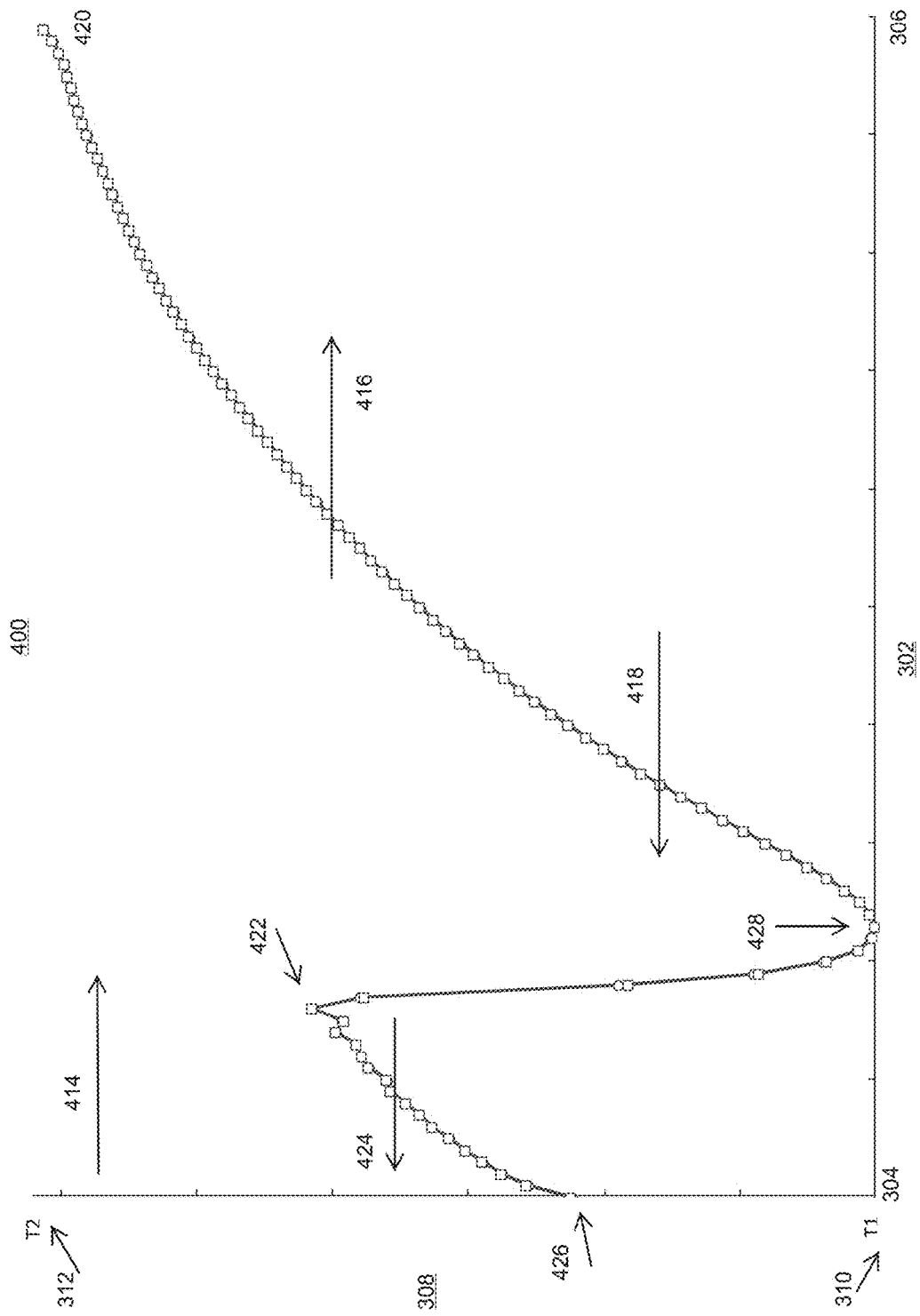

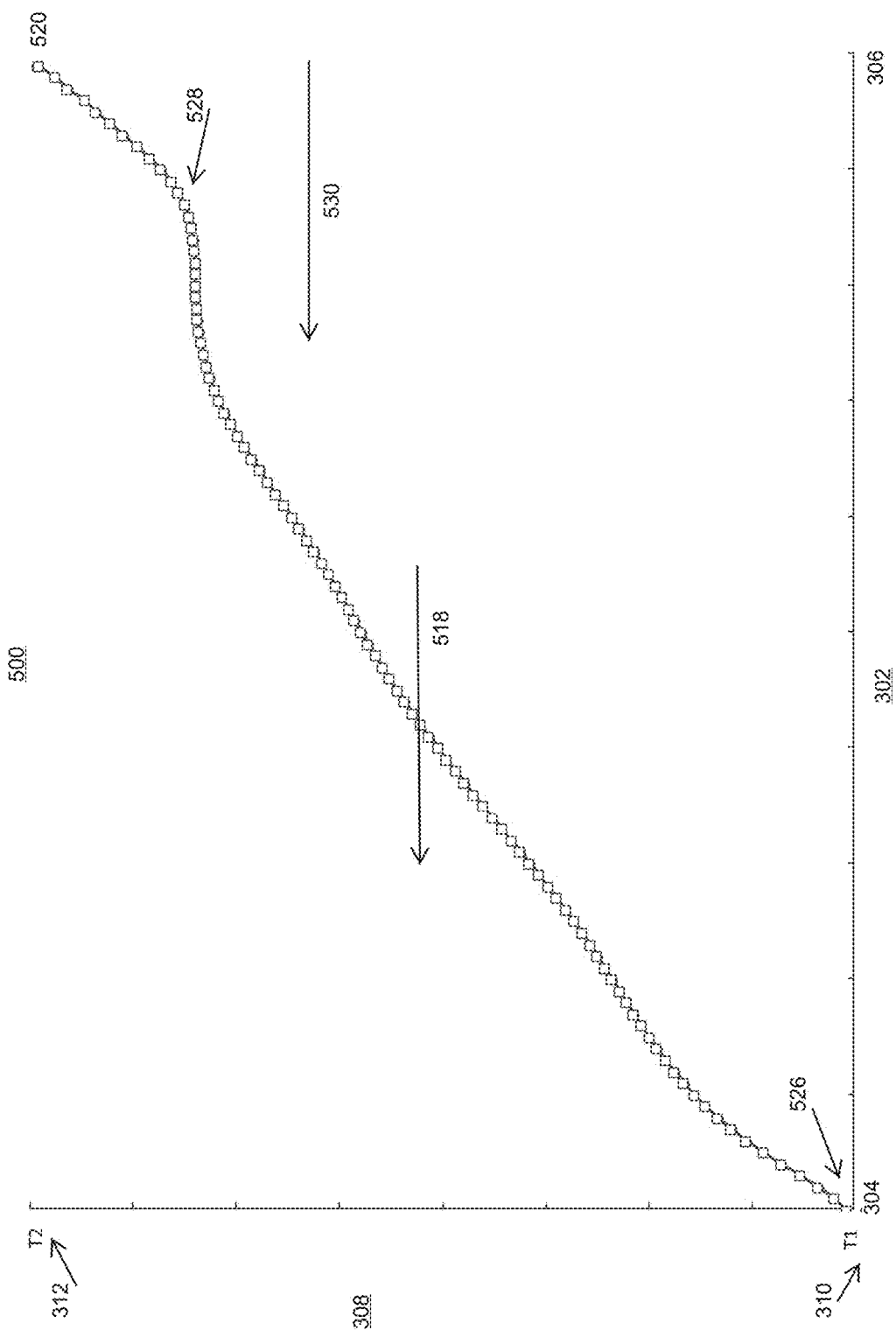

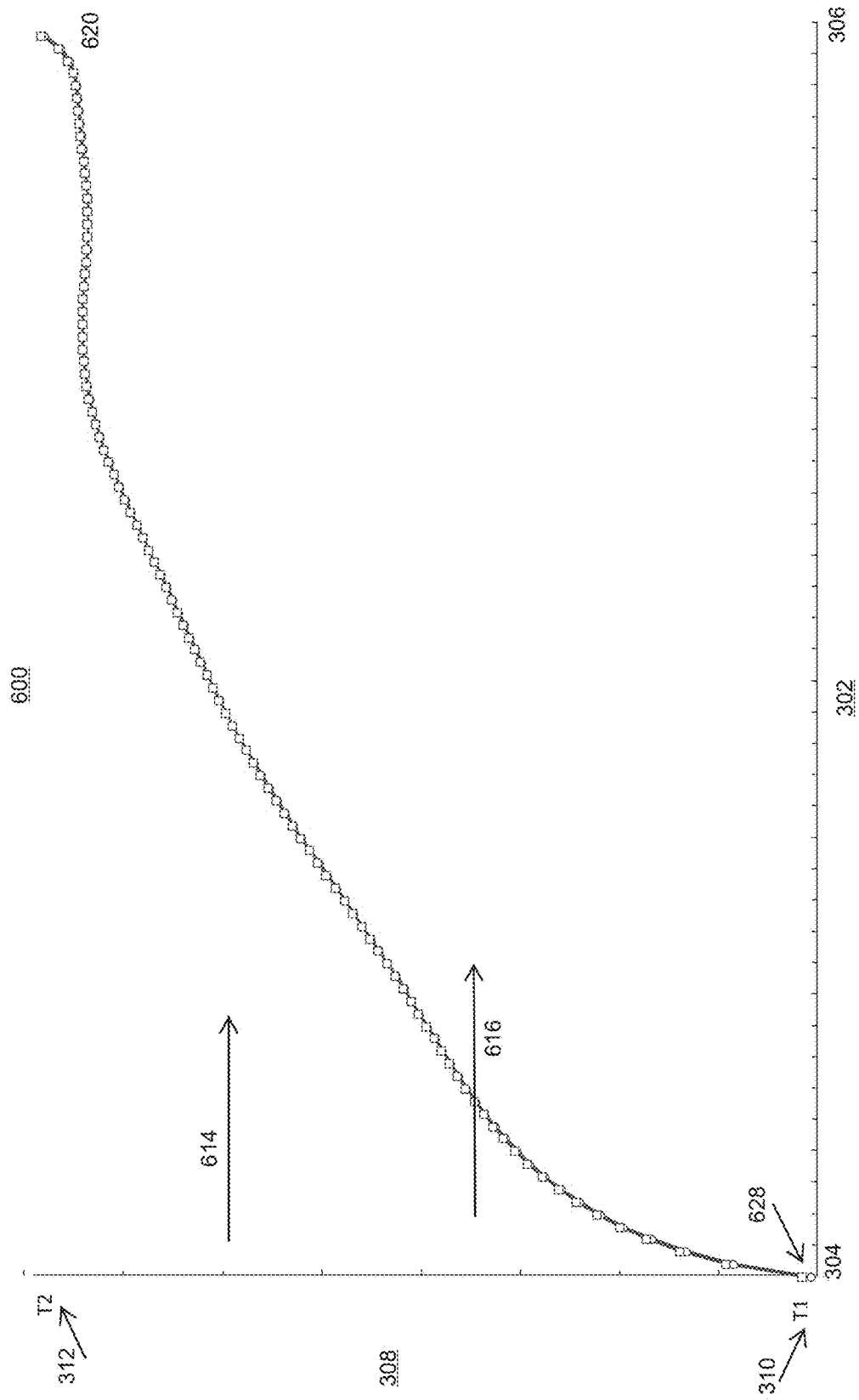

METHOD OF ADSORPTIVE GAS SEPARATION USING THERMALLY CONDUCTIVE CONTACTOR STRUCTURE

1. RELATED APPLICATIONS

The present application is a continuation-in-part of previously filed U.S. patent application Ser. No. 14/543,765, filed Nov. 17, 2014 and entitled "Method of Adsorptive Gas Separation Using Thermally Conductive Contactor Structure", which is a continuation of U.S. patent application Ser. No. 13/819,319, filed Feb. 26, 2013 and entitled "Method of Adsorptive Gas Separation Using Thermally Conductive Contactor Structure" and granted on Dec. 2, 2014 as U.S. Pat. No. 8,900,347, which is a United States national stage application under 35 USC 371 of previously filed PCT International Patent Application No. PCT/CA2011/050521, filed Aug. 26, 2011 and entitled "Method of Adsorptive Gas Separation using Thermally Conductive Contactor Structure", and which claims priority to previously filed U.S. Provisional Patent Application Ser. No. 61/377,875 filed Aug. 27, 2010 and entitled "Method of Adsorptive Gas Separation using Thermally Conductive Contactor Structure", the contents of each of which are herein incorporated by reference in their entirety.

2. TECHNICAL FIELD

The present invention relates generally to methods of adsorptive gas separation and systems therefore. More particularly, the present invention relates to methods of adsorptive gas separation using temperature swing adsorption processes in a thermally conductive parallel passage fluid contactor structure and systems incorporating the thermally conductive parallel passage fluid contactor structure.

3. BACKGROUND OF THE INVENTION

Temperature swing adsorption methods are known in the art for use in adsorptive separation of multi-component fluid mixtures, and gas mixtures in particular. Many conventional temperature swing adsorption processes are used for preferentially adsorbing one component of a feed gas mixture on an adsorbent material to separate it from the remaining feed gas components, and then subsequently to regenerate the adsorbent material to desorb the adsorbed component and allow for cyclic reuse of the adsorbent material. However, conventional temperature swing adsorption methods are typically limited in their efficiency due in part to limitations in heat and/or mass transport phenomena in the desorption or regeneration of the adsorbent material used in an adsorptive separation system, and also to limitations in the adsorption phase of the temperature swing adsorption process.

One shortcoming of typical conventional temperature adsorption processes is the inefficient adsorption of a feed gas component on the adsorbent material, which may result from the rapid increase in temperature of the adsorption front when moving through the adsorbent material due to the heat of adsorption released as the gas component is adsorbed. In many conventional temperature swing adsorption methods, such increases in the temperature of the adsorbent material during adsorption may result in decreased adsorbent capacity associated with "hot spots" in the adsorbent material and a corresponding decrease in efficiency of the temperature swing adsorption process. Another shortcoming of typically conventional temperatures swing adsorption methods is the inefficient desorption or regeneration of the adsorbent material, which may result from the difficulty in uniformly heating the adsorbent material as thermal energy is required to meet the heat of desorption of the adsorbed compound during desorption or regeneration. Such non-uniformities in the heating of the adsorbent material may typically result in retained adsorption of a gas component associated with "cold spots" in the adsorbent material, or may require the application of an unnecessarily large thermal flux to sufficiently desorb the gas component, which may lead to undesirably high heating costs and leave the adsorbent material unnecessarily overheated following desorption.

Further, conventional temperature swing adsorption methods typically employ adsorbent contactor structures such as adsorbent beds for contacting gas components with the adsorbent material. Exemplary known adsorbent contactors include packed bead or parallel plate adsorbent structures for adsorptive gas separation processes such as thermal and/or pressure swing adsorption processes, for example. However, some shortcomings of certain of the adsorbent contactors of the prior art relate to poor hydrodynamic, mass transport, and thermal characteristics of the contactor structure. In such cases, the poor thermal characteristics may undesirably result in either high thermal mass, which may require an undesirably large thermal energy flux to effect a given temperature change in the structure, and/or lower than desired thermal conductivity, which may result in undesirably large temperature differences within the structure, for example. Such undesirable thermal characteristics of certain adsorbent contactors of the prior art may contribute to some of the shortcomings of conventional temperature swing adsorption methods as described above. Aside from heat transport limitations, the poor hydrodynamics of certain conventional temperature swing adsorption structures may undesirably limit fluid throughput due to fluidization limitations, as in the case of beaded adsorbent beds. Further, in certain conventional systems, undesirably low mass transfer rates may limit the permissible cycle speed and also lower the dynamic selectivity of the cyclic adsorption-desorption process by limiting the adsorption selectivity of the system to only the adsorbent's inherent equilibrium selectivity, which may be undesirably low for separation of a given fluid mixture.

4. SUMMARY OF THE INVENTION

It is an object of the present invention to provide a thermal swing adsorption separation method that addresses some of the limitations of the prior art.

It is a further object of the invention to provide a thermal swing adsorption separation method for separating first and second fluid components of a fluid mixture using a parallel passage adsorbent contactor structure according to the present invention that addresses some of the limitations of the prior art.

It is yet a further object of the invention to provide a thermal swing adsorption gas separation process for separating carbon dioxide from a flue gas feed mixture according to the present invention that addresses some of the limitations of the prior art.

In one embodiment of the present invention, a temperature swing adsorption method for separating a fluid mixture comprising at least first and second fluid components is provided. The method comprises first admitting the fluid mixture into an adsorptive separation system comprising at least one parallel passage adsorbent contactor, where the parallel passage adsorbent contactor comprises a plurality of substantially parallel fluid flow passages oriented in a first axial direction between an inlet and an outlet end thereof, cell walls situated between the fluid flow passages comprising at least one adsorbent material, and a plurality of axially continuous thermally conductive filaments oriented in the axial direction and in direct contact with the at least one adsorbent material. Next, the method comprises admitting the fluid mixture into the inlet end of the parallel passage adsorbent contactor to flow towards the outlet end in the first axial direction, adsorbing at least a portion of the first fluid component on the at least one adsorbent material and transferring heat from a heat of adsorption of the first fluid component on the at least one adsorbent material along at least a portion of the thermally conductive filaments in a second axial direction towards the inlet end and opposite to the first axial direction during the adsorbing step. Next, the method comprises recovering a first product fluid depleted in the first fluid component relative to the fluid mixture from the outlet end. Following this, the method comprises desorbing at least a portion of the first fluid component adsorbed on the at least one adsorbent material by heating the at least one adsorbent material, and transferring heat along at least a portion of the thermally conductive filaments in either of the first or second axial directions to provide at least a portion of the heat of desorption of the first fluid component during the desorbing step. Finally, the method comprises recovering a desorbed second product fluid enriched in the first fluid component from at least one of the inlet and outlet ends.

In an alternative embodiment of the present invention, the temperature swing adsorption method additionally comprises admitting a pre-regeneration fluid into said parallel passage adsorbent contactor and desorbing at least a portion of said second fluid component co-adsorbed on said at least one adsorbent material by heating said at least one adsorbent material to a pre-regeneration temperature, prior to recovering said first product fluid.

In yet a further embodiment, the at least one adsorbent material is kinetically selective for said first fluid component and has a first mass transfer rate for said first fluid component which is greater than a second mass transfer rate for said second fluid component. In an optional such embodiment, the temperature swing adsorption comprises admitting said fluid mixture into said inlet end of said parallel passage adsorbent contactor at a space velocity greater than said second mass transfer rate for said second fluid component and less than said first mass transfer rate for said first fluid component In another embodiment of the present invention, a temperature swing adsorption process for separating carbon dioxide from a flue gas feed mixture comprising at least carbon dioxide and nitrogen components is provided. The process first comprises admitting the flue gas feed mixture, into an adsorptive separation system comprising at least one parallel passage adsorbent contactor, where the parallel passage adsorbent contactor comprises a plurality of substantially parallel fluid flow passages oriented in a first axial direction between an inlet and an outlet end thereof, cell walls situated between the fluid flow passages comprising at least one carbon dioxide adsorbent material, and a plurality of axially continuous thermally conductive filaments oriented in the axial direction and in direct contact with the at least one carbon dioxide adsorbent material. Next, the process comprises admitting the flue gas into the inlet end of the parallel passage adsorbent contactor to flow towards the outlet end in the first axial direction, and adsorbing at least a portion of the carbon dioxide component on the at least one carbon dioxide adsorbent material. Next, the process comprises transferring heat from a heat of adsorption of carbon dioxide on the at least one carbon dioxide adsorbent material along at least a portion of the thermally conductive filaments in a second axial direction towards the inlet end and opposite to the first axial direction during the adsorbing step, and recovering a flue gas product stream depleted in carbon dioxide relative to the flue gas feed mixture from the outlet end. Following this, the process comprises desorbing at least a portion of the carbon dioxide adsorbed on the at least one carbon dioxide adsorbent material by heating the at least one adsorbent material, and transferring heat along at least a portion of the thermally conductive filaments in either of the first or second axial directions to provide at least a portion of the heat of desorption of the carbon dioxide during the desorbing step. Finally, the process comprises recovering a desorbed carbon dioxide product enriched in carbon dioxide from at least one of the inlet and said outlet ends.

In yet a further embodiment of the present invention, a temperature swing adsorption process for separating at least one of carbon dioxide and hydrogen sulfide from a natural gas feed mixture comprising at least one of carbon dioxide and hydrogen sulfide and methane components is provided. The process first comprises admitting the natural gas feed mixture into an adsorptive separation system comprising at least one parallel passage adsorbent contactor, where the parallel passage adsorbent contactor comprises a plurality of substantially parallel fluid flow passages oriented in a first axial direction between an inlet and an outlet end thereof, cell walls situated between the fluid flow passages comprising at least one adsorbent material selective for at least one of carbon dioxide and hydrogen sulfide over methane, and a plurality of axially continuous thermally conductive filaments oriented in the axial direction and in direct contact with the at least one adsorbent material. Next the process comprises admitting the natural gas feed mixture into the inlet end of the parallel passage adsorbent contactor to flow towards the outlet end in the first axial direction, adsorbing at least a portion of at least one of the carbon dioxide and hydrogen sulfide components on the at least one adsorbent material, and transferring heat from a heat of adsorption on the at least one adsorbent material along at least a portion of the thermally conductive filaments in a second axial direction towards the inlet end and opposite to the first axial direction during the adsorbing step. Next, the process comprises recovering a natural gas product stream depleted in at least one of carbon dioxide and hydrogen sulfide relative to the natural gas feed mixture from the outlet end. Following this, the process comprises desorbing at least a portion of at least one of carbon dioxide and hydrogen sulfide adsorbed on the at least one adsorbent material by heating the at least one adsorbent material, transferring heat along at least a portion of the thermally conductive filaments in either of the first or second axial directions to provide at least a portion of the heat of desorption of carbon dioxide or hydrogen sulfide during the desorbing step, and recovering a desorbed product enriched in at least one of carbon dioxide and hydrogen sulfide from at least one of the inlet and outlet ends.

Further advantages of the invention will become apparent when considering the drawings in conjunction with the detailed description.

5. BRIEF DESCRIPTION OF THE DRAWINGS

The methods of adsorptive gas separation of the present invention will now be described with reference to the accompanying drawing figures, in which:

FIG. 4 illustrates an axial thermal profile graph of a parallel passage adsorbent contactor during an adsorption step according to an embodiment of the present invention.

FIG. 5 illustrates an axial thermal profile graph of a parallel passage adsorbent contactor at the conclusion of an adsorption step according to an embodiment of the present invention.

FIG. 6 illustrates an axial thermal profile graph of a parallel passage adsorbent contactor at the conclusion of a desorption or regeneration step according to an embodiment of the present invention.

Like reference numerals refer to corresponding parts throughout the several views of the drawings.

6. DETAILED DESCRIPTION OF THE INVENTION

Figure 1:
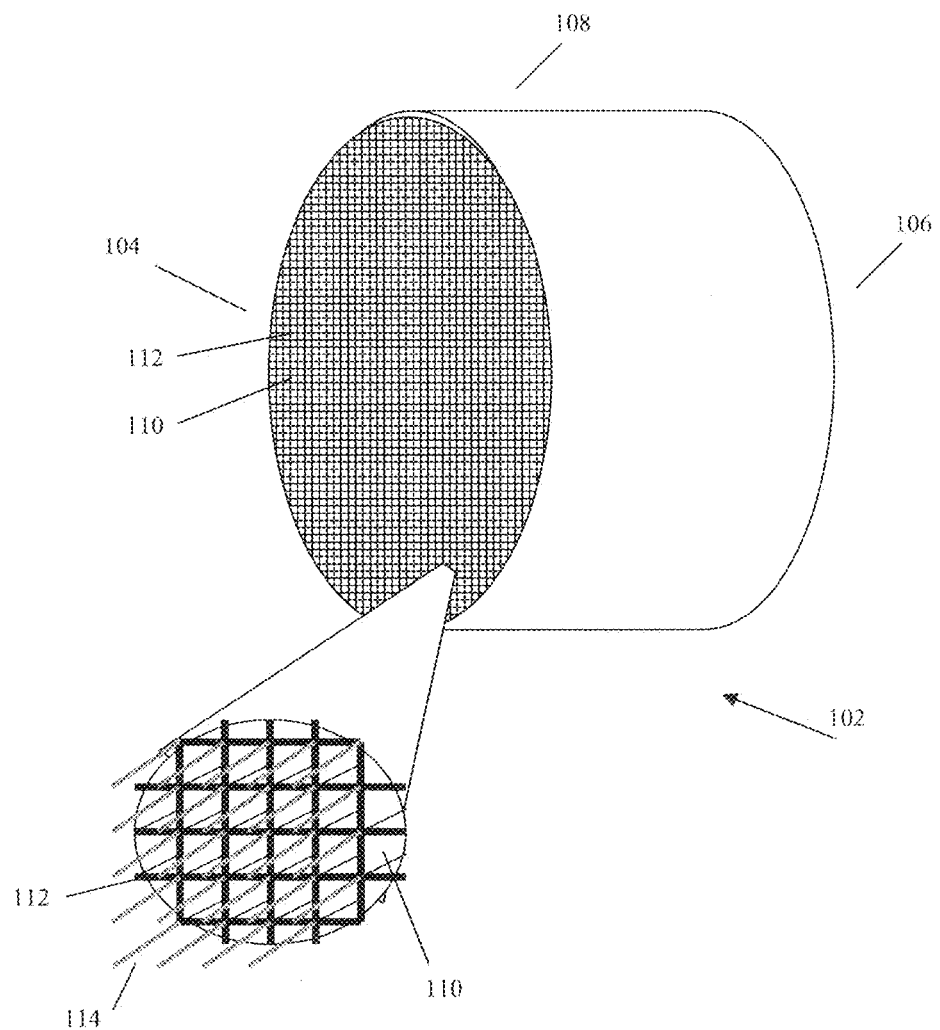
FIG. 1 illustrates a cross-sectional and corresponding inset perspective view of a parallel passage adsorbent contactor structure for use in accordance with an embodiment of the present invention.

In one embodiment of the present invention, a temperature swing adsorption (hereinafter "TSA") method is provided for separating a fluid mixture comprising at least first and second fluid components. In such an embodiment, the TSA method may comprise an initial step of admitting the fluid mixture or feed mixture, into an adsorptive separation system which comprises at least one parallel passage adsorbent contactor. In particular, suitable such parallel passage adsorbent contactors may comprise a plurality of substantially parallel fluid flow passages oriented in a first axial direction between an inlet and outlet end of the contactor in order to permit fluid to flow through the contactor, and cell walls which comprise at least one adsorbent material situated between and separating the fluid flow passages. The parallel passage adsorbent contactor may also desirably comprise a plurality of axially continuous thermally conductive filaments oriented in the axial direction of the contactor and in direct contact with the at least one adsorbent material comprised in or on the cell walls of the contactor. The fluid mixture may then be admitted into the inlet end of the parallel passage adsorbent contactor to flow in a first axial direction through the contactor towards the outlet end, and at least a portion of the first fluid component may be adsorbed on the at least one adsorbent material, which may preferably be selective for adsorbing the first fluid component over other components of the fluid mixture. In an alternative embodiment of the present invention, the parallel passage adsorbent contactor may comprise at least one axially thermally conductive material such that the contactor is preferably thermally conductive in the axial direction, and may be homogenous in thermal conductivity in the axial direction, or may have one or more axially oriented regions of higher axial thermal conductivity relative to the rest of the contactor structure, for example.

In a further alternative embodiment, the parallel passage adsorbent contactor may comprise at least one thermally conductive material such that the contactor is preferably thermally conductive in at least one of an axial (i.e. substantially parallel to the axial dimension of the parallel fluid flow passages and direction of fluid flow through the contactor) direction and a transverse direction (i.e. substantially perpendicular to the axial dimension of the parallel fluid flow passages and direction of fluid flow through the contactor). In one such alternative embodiment, the parallel passage adsorbent contactor may comprise at least one thermally conductive material configured substantially in a plane parallel in at least one direction to the axial direction of the fluid flow passages and direction of fluid flow through the contactor, such that the parallel passage adsorbent contactor may desirably be thermally conductive in at least axial and transverse directions along the plane, for example. In a particular such embodiment, the parallel passage contactor may comprise at least one thermally conductive material configured such that the contactor is desirably thermally conductive in either of an axial direction substantially parallel to the axial dimension of the contactor, or in a transverse direction substantially perpendicular to the axial dimension of the contactor, for example.

In a preferred embodiment of the present invention, the at least one adsorbent material comprised in the parallel passage adsorbent contactor may desirably be dynamically selective for adsorption of the first fluid component over at least one other fluid mixture components, such that a dynamic selectivity is sufficiently high to usably provide adsorptive separation of the fluid mixture by selective adsorption of the first fluid component. Such dynamic selectivity over the cycle of the TSA separation method may comprise at least one of an equilibrium selectivity of the at least one adsorbent material for the first fluid component, and a kinetic selectivity of the at least one adsorbent material for the first fluid component. In one such preferred embodiment, the feed mixture may be admitted to the adsorbent contactor at a space velocity (Vgas/Vads/t) less than the mass transfer rate (1/s) of the first fluid component to be selectively adsorbed, but greater than the mass transfer rate (1/s) of at least one second fluid component which may be a diluent desired to be substantially prevented from adsorption, such that the adsorption step may comprise at least a kinetic selectivity based on the mass transfer rates of the fluid components on the adsorbent material at the adsorbent temperature during the adsorption step.

In the present embodiment, at least a portion of the heat released from the heat of adsorption of the first fluid component on the at least one adsorbent material is then transferred axially along the contactor structure, such as along at least a portion of the thermally conductive filaments in the adsorbent contactor in a second axial direction (opposite to the first axial direction) back along the contactor towards the inlet end of the contactor during the adsorption of the first component on the adsorbent material, such as to reduce a spike in the temperature of the at least one adsorbent as adsorption of the first fluid component occurs, and optionally also to desirably retain at least a portion, such as to desirably retain a significant portion of the heat energy released from the heat of adsorption within the adsorbent contactor to allow recovery of such thermal energy during later regeneration of the adsorbent material. A first product fluid depleted in the first fluid component relative to the feed fluid mixture is then recovered from the adsorbent contactor, such as from the outlet end thereof.

In an alternative embodiment, at least a portion of the heat released from the heat of adsorption of the first fluid component on the at least one adsorbent material may then be transferred in at least one of an axially and optionally also a transversely oriented direction relative to the primary axial direction of the fluid flow through the adsorbent contactor structure. In one such alternative embodiment, the adsorbent contactor structure may comprise axially oriented thermally conductive filaments, and also transversely oriented thermally conductive filaments, such as transverse filaments oriented substantially transversely relative to the primary axial direction of fluid flow through the adsorbent contactor structure, and in a plane with the axially oriented thermally conductive filaments. In one such alternative embodiment, at least a portion of the heat released from the heat of adsorption of the first fluid component on the at least one adsorbent material may thereby be transferred in a first axial direction along the primary axial direction of fluid flow in the adsorbent contactor structure such as along at least a portion of axial thermally conductive filaments, and also in a transverse direction relative to the first axial direction, such as along at least a portion of transversely oriented thermally conductive filaments. In one such embodiment, the axial and transverse thermally conductive filaments may be provided by a single suitable conductive filament structure, such as a mesh, cloth, or other filament structure comprising both axial and transversely oriented thermally conductive filaments, for example.

In one embodiment, an intermediate recycle or pre-regeneration step may be performed in order to desirably desorb at least a portion of any of the second fluid component or other diluent fluid components which may be undesirably co-adsorbed on the at least one adsorbent material along with the adsorbed first fluid component (such undesired second and/or diluent fluid components may have become adsorbed on the adsorbent material during a previous cooling or conditioning step, or during the feed adsorption step due to incomplete selectivity of the adsorbent material, for example) and thereby increase the dynamic selectivity of the process for separation of the first fluid component from the second and/or any other diluent fluid components. Such an intermediate pre-regeneration step may be particularly desirable for use in separations where the first fluid component of the feed fluid mixture is relatively dilute, such as at first component feed concentrations below about 10% and even more preferably below about 5%, for example. Such an intermediate pre-regeneration step may desirably be conducted at an intermediate temperature above the temperature of the adsorption or feed step, but below the temperature of the following desorption or regeneration step. In one such embodiment, heat may be provided for such pre-regeneration step by one or more means, such as: providing a purge fluid at an intermediate temperature and providing heat to the adsorbent material by means of the thermally conductive filaments in the adsorbent contactor, for example. In one particular such embodiment, a heated purge fluid enriched in the first component may be used as a suitable purge fluid, such that at least a portion of any adsorbed second or diluent fluid components adsorbed on the adsorbent material are desorbed at an intermediate temperature and displaced by additional adsorption of first fluid component from the heated purge fluid onto the adsorbent material, such that the adsorbed fluid species desirably comprises only the first fluid component.

In an optional embodiment, during a pre-regeneration step, at least a portion of the heat of adsorption generated during the adsorption step may optionally be transferred in either a first or second (opposite to the first) axial direction along at least a portion of the thermally conductive filaments of the adsorbent contactor structure, such as to provide at least a portion of the heat of desorption (energy required for adsorption to overcome the adsorptive bond of the adsorbed fluid species to the adsorbent) and/or kinetic activation heat (energy required for transferring adsorbed second component molecules from the adsorptive surface of the adsorbent to the gas phase) of the second fluid component from the at least one adsorbent material during the pre-regeneration step. In another optional embodiment, a purge fluid may optionally be admitted, such as from the outlet end, into the parallel passage adsorbent contactor such as to flow in substantially the second axial direction (opposite to the first axial direction) through the adsorbent contactor towards the inlet end (or optionally in another direction substantially opposite to the direction of flow of fluid mixture or feed mixture through the adsorbent contactor during the adsorption step), which may desirably retain and employ at least a portion of the heat of adsorption of the first component to provide at least a portion of the required heat of desorption during the pre-regeneration step and for desorption of the first component, second component, and/or other co-adsorbed components, adsorbed on the at least one adsorbent material. In one such embodiment, a resulting reflux fluid may be recovered from adsorbent contactor, such as from the inlet end thereof.

In one embodiment, following such an intermediate recycle or pre-regeneration step, the resulting purge fluid exiting the adsorbent contactor may be recycled such as for supply as a reflux stream to either the inlet or outlet end of an adsorbent contactor (may be a bottom to bottom or "heavy" reflux stream supplied to the inlet or heavy end of the adsorbent contactor in a subsequent cycle for example) or alternatively may be recycled into the feed fluid for admitting to the adsorbent contactor in a subsequent feed step. In one such preferred embodiment, the purge fluid may be supplied to the adsorbent contactor in such a pre-regeneration step at a suitable temperature and space volume (Vgas/Vads/t) greater than the mass transfer rate (1/s) for the desorption of undesired adsorbed second or diluent component fluid, but desirably less than the mass transfer rate (1/s) for desorption of adsorbed first fluid component adsorbed on the adsorbent material.

Following such recovery of the first product fluid and optionally also such pre-regeneration purge step, at least a portion of the first fluid component adsorbed on the at least one adsorbent material is then desorbed by heating the at least one adsorbent material, and heat is transferred in either axial direction along at least a portion of the thermally conductive filaments of the adsorbent contactor to provide at least a portion of the heat of desorption (energy required for desorption) and/or kinetic activation heat (energy required for transferring adsorbed first component molecules from adsorptive surface to the gas phase) of the first fluid component from the at least one adsorbent material during the desorption step. Heating of the adsorbent material may be provided by supplying heat from at least one heat source, including, but not limited to: providing a heated desorption or purge fluid to the adsorbent contactor which may comprise a heated inert gas, recycle gas, and/or condensable gas such as steam or solvent; and heating thermally conductive filaments or other materials in the adsorbent contactor structure, such as by electrical resistive heating of conductive filaments, or indirect heating of such filaments or structure materials such as with a heat transfer medium. Finally, a desorbed second product fluid enriched in the first fluid component desorbed from the adsorbent material is recovered from at least one of the inlet and outlet ends of the parallel passage adsorbent contactor. In one embodiment of the invention where a condensable purge fluid is used to provide at least a portion of the heating of the adsorbent material in the desorption step, the recovered product fluid may subsequently be cooled to condense the purge fluid (such as steam or solvent, for example) for removal from the desorbed product fluid, thereby allowing for increased purity of the desorbed product fluid, for example. In one such embodiment, a heated desorption or purge fluid may be admitted to the parallel passage adsorbent contactor to flow in at least one of the first axial direction (i.e. the same direction as the feed fluid during the adsorption step) and the second axial direction (i.e. opposite to the direction of the feed fluid during adsorption step) so as to provide at least a portion of the heat of desorption and/or kinetic activation heat required during desorption.

The present TSA separation method according to the above embodiment may then optionally be repeated in the parallel passage adsorbent contactor to provide for a continuous or repeated cyclic separation method for separating a first fluid component from the feed fluid mixture. In particular, an adsorptive separation system for operation according to the present TSA separation method may desirably comprise two or more such parallel passage adsorbent contactors, so as to provide for staggered operation of the present TSA separation method and allow continuous and/or semi-continuous adsorptive separation from a source of feed fluid. In particular, an adsorptive separation system may comprise two or more parallel passage adsorbent contactors such that the first product fluid may be recovered from one contactor while the desorbed second product fluid is recovered from the second contactor. Any suitable mechanical arrangement may be implemented in the adsorptive separation system to provide for and control the fluid flows required for implementation of the TSA method of the present embodiment, such as an adsorptive separation system using mechanical/pneumatic or other types of valves or other flow control devices for example to implement the fluid flows of the steps of the present TSA method, as are known in the art for systems comprising one, two, or three or more adsorbers containing adsorbent material.

In one embodiment of the present invention, an adsorptive separation system suitable for implementing the present inventive TSA method comprises at least one parallel passage adsorbent contactor which each comprise a plurality of substantially parallel fluid flow passages oriented in a first axial direction between and inlet and outlet end of the contactor in order to permit fluid to flow through the contactor, and cell walls which comprise at least one adsorbent material situated between and separating the fluid flow passages. Each suitable such parallel passage adsorbent contactor further comprises a plurality of axially continuous thermally conductive filaments oriented in the axial direction of the contactor and in direct contact with the at least one adsorbent material comprised in or on the cell walls of the contactor. Certain such parallel passage adsorbent contactor structures which may be suitable for use in implementing the TSA method according to an embodiment of the present invention are described in the applicant's co-pending PCT international patent application filed as PCT/CA2010/000251 on Feb. 26, 2010, the contents of which are herein incorporated by reference as though they had formed part of this application as presently filed. One particular parallel passage adsorbent contactor configuration suitable for implementation of the TSA method according to an embodiment of the present invention is shown in FIGS. 1 and 2 and described in further detail below.

FIG. 1 illustrates an exemplary parallel passage adsorbent contactor structure suitable for implementing the present TSA method according to an embodiment of the invention. The exemplary parallel passage adsorbent contactor structure indicated generally at 102 comprises a substantially cylindrical shape defined by substantially cylindrical outer surface 108. The exemplary contactor structure 102 is shown with first and second ends 104 and 106, with multiple substantially parallel passages 110 extending axially along the length of the structure 102, from the first end 104 to the second end 106. The parallel passages 110 are preferably continuous along the length of the structure 102 and are adapted to allow the flow of fluid through the passages 110. Parallel passages 110 are separated from each other by cell walls 112 to form an exemplary honeycomb structure wherein each passage 110 is substantially separated from adjacent passages 110 by at least one cell wall 112 which desirably comprises at least one adsorbent material. Parallel passage adsorbent contactor structure 102 also comprises axially continuous thermally conductive filaments 114 embedded in or otherwise situated within cell walls 112, in order to provide at least thermal and optionally also electrical conductivity for the parallel passage adsorbent contactor structure 102 in either axial direction. In one embodiment, the parallel passage adsorbent contactor structure 102 may be a substantially honeycomb structure, as illustrated in FIG. 1, wherein cell walls 112 are substantially arranged in a grid pattern, such as a rectangular grid as shown in FIG. 1, or alternatively, as a hexagonal or other substantially polygonal, circular or oval grid. It is to be understood that for the purposes of the present description the term "axial" and "axial direction" with respect to the contactor structure encompasses both the directions that are substantially parallel to a line between the first and second ends (or inlet and outlet ends) of a contactor structure, and also any direction that extends in a substantially axial fashion with regard to the contactor, such as directions that are substantially less than 45 degrees from a line between the first and second ends, for example.

Figure 2:
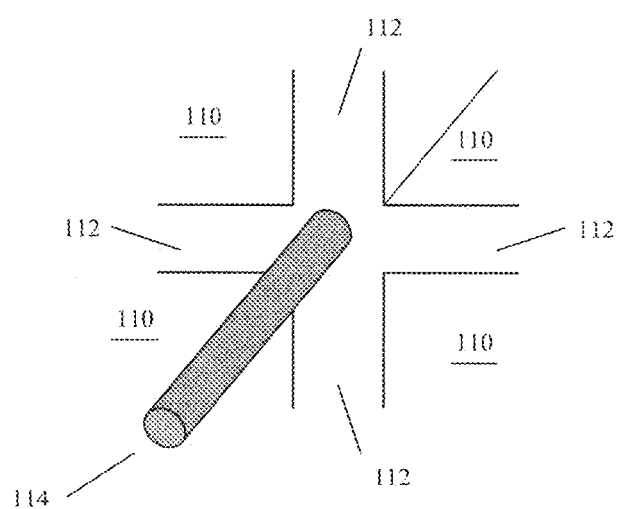
FIG. 2 illustrates a detailed cross-sectional perspective view of the parallel passage adsorbent contactor structure shown in FIG. 1 for use in accordance with an embodiment of the invention.

Similarly, FIG. 2 illustrates a detailed cross-sectional perspective view of the parallel passage adsorbent contactor structure shown in FIG. 1, having a substantially rectangular grid honeycomb structure, suitable for implementing the present TSA method according to an embodiment of the invention. In such a rectangular grid honeycomb structure 102 as shown in FIGS. 1 and 2, axially continuous and thermally and/or electrically conductive filaments 114 are in direct contact with the cell walls 112 which comprise at least one adsorbent material, and may advantageously be embedded in or otherwise situated within cell walls 112 at the intersection of two cell walls 112, which corresponds generally with a corner of each adjacent parallel passage 110. In such a manner, the axially continuous and thermally and/or electrically conductive filaments 114 may be advantageously located proximate to multiple adjoining parallel passages 110, such that the thermal and/or electrical conductivity capacity provided by the filaments 114 is in close proximity to multiple parallel passages 110 and to the fluid that may be contained in or passed through such parallel passages 110 during use of the parallel passage adsorbent contactor. In alternative embodiments, honeycomb structures with cell walls 112 arranged in alternative geometric arrangements may be utilized, for example having cell walls in a hexagonal, triangular, or other polygonal grid arrangement, resulting in substantially similarly shaped parallel fluid flow passages 110. Further, other embodiments may comprise parallel passages 110 with cross sectional shapes other than polygons, such as circular, semi-circular, oval, or obround (a shape with two semicircles connected by parallel lines connecting their endpoints) cross-sections, for example. Also, in other alternative embodiments, axially continuous conductive filaments 114 may be embedded in or otherwise located within cell walls 112 either at the intersections of cell walls 112, or at other locations, such as within cell walls 112 between such intersections for example.

In the honeycomb parallel passage adsorbent contactor 102 as illustrated in FIGS. 1 and 2, and in other alternative embodiments as described above, axially continuous and thermally and/or electrically conductive filaments 114 may desirably be used to conduct thermal energy (either as sensible thermal energy or as thermal energy resulting from electrical resistance heating of the filaments) into or out of the contactor 102 or axially from one portion of the contactor structure 102 to another, and accordingly to provide for respective heating and/or cooling of portions of or the entire contactor 102. In particular, at least a portion of the axially continuous thermally and/or electrically conductive filaments 114 of contactor 102 may desirably be thermally connected to a source or sink of thermal energy, in order to conduct thermal energy into or out of the contactor structure 102. Such thermal energy conducted into or out of the contactor 102 may desirably increase or decrease the temperature of the contactor 102, such as cell walls 112 comprising the at least one adsorbent material, and/or may transfer thermal energy into or out of a fluid within the passages 110 of the adsorbent contactor structure 102. Exemplary thermal circuits comprising connections of thermally and/or electrically conductive filaments 114 of the adsorbent contactor structure 102 to controllable heat sources and/or heat sinks may be employed to provide controllable heating and cooling of the cell walls 112 of the structure and the adsorbent material(s) comprised therein through transfer of thermal energy into and/or out of the contactor structure 102 via the conductive filaments 114, allowing for thermal control of the contactor 102 or a fluid passed through the contactor 102 via an exemplary thermal and/or electrical circuit connected to the conductive filaments 114. Further, axially continuous thermally and/or electrically conductive filaments 114 also provide for the transfer of thermal energy in either a first or second axial direction within the contactor structure 102 itself, such as from the first end 104 of the contactor 102 to the second end 106, which may be particularly desirable to provide control of a thermal profile along the axial length of the contactor 102, for example. In such a manner, embodiments of the present TSA method according to the present invention may desirably transfer heat in either axial direction along the parallel passage adsorbent contactor 102 to control thermal conditions and profile within the parallel passage adsorbent contactor 102 that are independent of the temperature of a fluid flowing into or out of the contactor structure 102, by means of transferring thermal energy within the contactor structure 102 (and optionally also into or out of the contactor structure 102), through the axially continuous conductive filaments 114.

The parallel passage adsorbent contactor structures as described above for use in implementing the present TSA methods according to an embodiment of the present invention may comprise anisotropic thermal conductivity in the axial direction relative to the transverse direction, due to the provision of substantially increased thermal conductivity in the axial direction by the axially continuous thermally conductive filaments, relative to the thermal conductivity of the structure in the transverse direction. In one such embodiment, such parallel passage adsorbent contactor structures may comprise anisotropic thermal conductivity where the thermal conductivity in the axial direction is at least 10 times, and more particularly at least 100 times the thermal conductivity of the structure in the transverse direction, due to the axial thermal conductivity capacity provided by the axially continuous thermally conductive filaments included in the structure. In an alternative embodiment of the present invention, the parallel passage adsorbent contactor may comprise at least one axially thermally conductive material such that the contactor is preferably thermally conductive in the axial direction, and may be homogenous in thermal conductivity in the axial direction, or may have one or more axially oriented regions of higher axial thermal conductivity relative to the rest of the contactor structure which may or may not comprise discrete conductive filaments, for example.

In another alternative embodiment of the present invention, a parallel passage adsorbent contactor structure for use in implementing the present TSA methods according to an embodiment of the present invention may comprise substantially isotropic thermal conductivity in the axial direction and transverse direction or along a substantial plane (parallel to the axial direction), for example, substantially parallel to the parallel passages or the adsorbent contactor or first axial direction, such as by employing axially and optionally also transversely oriented continuous or substantially continuous thermally and/or electrically conductive filaments. Any suitable known thermally and/or electrically conductive filament materials (for example, metal, metal alloys, carbon, graphite, or carbon nano-fibers) may be drawn, shaped, formed or otherwise fashioned into continuous filaments or substantially continuous filaments extending in axial and optionally also transverse directions such as spaced filaments, mesh, mats, or fabric, for example.

In a particular embodiment suitable for implementing the present TSA methods, the parallel passage adsorbent contactor structure 102 may comprise an adsorbent compound that is operable to interact with a fluid mixture passed through the passages 110 of the parallel passage adsorbent contactor 102. For example, the cell walls 112 of the contactor 102 may comprise at least one adsorbent compound that is selected to adsorb a first fluid component of the fluid mixture admitted through the parallel fluid flow passages 110 and in contact with the cell walls 112 of the contactor. In such embodiments, the thermally and/or electrically conductive filaments 114 within the cell walls 112 may advantageously provide for transferring thermal energy into and/or out of the adsorbent structure 102, such as to enable the use of the adsorbent structure 102 in the adsorptive separation system to implement the TSA methods of the present invention, whereby the active adsorbent material in the cell walls 112 may be heated by the thermally and/or electrically conductive filaments 114 to raise the temperature of the adsorbent material, such as during a desorption step, and thereby to desorb at least a portion of an adsorbed fluid component. In such embodiment, any suitable known adsorbent compounds, or combinations thereof, which may be desirably selected in order to adsorb a desired first component of the feed fluid mixture may be comprised in or on the cell walls 112 of the contactor.

In a further such embodiment, any suitable active adsorbent compound known to be operable to adsorb at least a portion of the first fluid component of the feed fluid mixture admitted through the passages 110 of parallel passage adsorbent contactor structure 102, may be comprised in or on the cell walls 112 of the structure. Exemplary such known adsorbent compounds may comprise, but are not limited to: desiccant, activated carbon, carbon molecular sieve, carbon adsorbent, graphite, activated alumina, molecular sieve, aluminophosphate, silicoaluminophosphate, zeolite adsorbent, ion exchanged zeolite, hydrophilic zeolite, hydrophobic zeolite, modified zeolite, natural zeolites, faujasite, clinoptilolite, mordenite, metal-exchanged silico-aluminophosphate, uni-polar resin, bi-polar resin, aromatic cross-linked polystyrenic matrix, brominated aromatic matrix, methacrylic ester copolymer, graphitic adsorbent, carbon fiber, carbon nanotube, nano-materials, metal salt adsorbent, perchlorate, oxalate, alkaline earth metal particle, ETS, CTS, metal oxide, chemisorbent, amine, organo-metallic reactant, hydrotalcite, silicalite, zeolitic imadazolate framework and metal organic framework (MOF) adsorbent compounds, and combinations thereof. In a preferred embodiment of the present invention, such suitable active adsorbent compound may desirably be selected so as to provide sufficiently high dynamic selectivity (which may comprise at least one of equilibrium and/or kinetic selectivity) for a first fluid component over a second fluid component over the cyclic TSA process.

In yet a further embodiment, the honeycomb parallel passage adsorbent contactor structure 102 shown in FIG. 1 may comprise an extruded honeycomb structure such as may be made by the extrusion of a ceramic or other composite slurry material through a die. In such a case, the multiple parallel passages 110 extending through the parallel passage fluid contactor structure 102 and the cell walls 112 separating adjacent passages 110 may be formed by the shape of an exemplary extrusion die, such as by an extrusion die comprising multiple spaced apart pin or rod die elements, through which a ceramic or other composite slurry may be extruded to form the structure 102. In such an embodiment, said ceramic or other composite slurry may comprise at least one inactive or structural material such as a binder material, for example, in addition to the at least one adsorbent material operable to interact with a fluid passed through passages 110 of structure 102, for example. In other embodiments, said inactive or structural material may comprise at least one of a clay, ceramic, colloid, silica, adhesive, resin, and binder compound, or combinations thereof.

According to an embodiment suitable for use in implementing the TSA methods according to embodiments of the invention, axially continuous thermally and/or electrically conductive filaments 114 may comprise any suitable known thermally and/or electrically conductive materials which may be drawn, shaped, formed or otherwise fashioned into a continuous filament 114. In a preferred embodiment, filaments 114 may comprise one or more materials having a desirably high thermal conductivity, in order to enable efficient conduction of thermal energy into or out of the cell walls 112 of parallel passage fluid contactor structure 102, within contactor 102 in the axial direction, and/or into or out of fluid passing through the passages 110 of contactor 102. In an optional embodiment, substantially continuous filaments oriented in a transverse direction may also be employed such as to enable conduction of thermal energy in a transverse direction (relative to the axial direction, such as in a transverse direction along a plane substantially parallel to the axial direction). Exemplary such known thermally conductive materials may comprise, but are not limited to, aluminum, copper, tungsten, silver, gold and metallic alloys thereof, as well as carbon, and carbon fiber and nano-fiber materials. Advantageously, the axially continuous conductive filaments 114 in suitable contactor structures 102 may be formed from suitable known materials having an axial thermal conductivity of at least 200 W/mK, and more preferably at least about 400 W/mK, in order to provide filaments 114 capable of efficiently conducting thermal energy into, out of, or within the contactor structure 102. In a particular embodiment, the axially continuous thermally and/or electrically conductive filaments 114 may comprise a thermally conductive carbon material comprising one or more of a phenolic resin carbon fiber, a mesophase carbon fiber, and a carbon nanotube material, wherein the carbon material has an axial thermal conductivity of at least 400 W/mK, and more preferably at least about 500 W/mK. In a further embodiment, the type of material and relative dimensions and spacing of the axially continuous thermally and/or electrically conductive filaments 114 may be selected so as to provide a bulk axial thermal conductivity of the entire parallel passage adsorbent contactor structure of at least 0.25 W/mK, and more particularly of at least about 1 W/mK. In yet a further exemplary embodiment, the type of material and relative dimensions and spacing of the axially continuous thermally and/or electrically conductive filaments 114 may be selected so as to provide a bulk axial thermal conductivity of the entire parallel passage fluid contactor structure of at least about 10 W/mK. In one exemplary embodiment where the parallel passage adsorbent contactor structure comprises a void fraction of about 35% and comprises conductive filaments with an axial thermal conductivity of about 600 W/mK, the structure may desirably comprise a bulk axial thermal conductivity of at least about 10 W/mK and more desirably at least about 20 W/mK, for example.

In yet another embodiment, the axially continuous thermally conductive filaments 114 running axially within contactor structure 102 may also be electrically conductive. Preferably, such electrically conductive filaments 114 may be resistively heated upon passing an electrical current through the filaments 114 in an axial direction. Therefore, electrically conductive filaments may be controllably heated or cooled by connecting the electrically conductive filaments to an electrical circuit, and controlling the passage of an electric current through the filaments to increase and/or decrease the relative temperature of the filaments 114 by means of resistive heating, such as to implement desorption steps of the present inventive TSA methods, for example. This in turn provides for electrical control of heating and/or cooling of the cell walls 112 of the parallel passage fluid contactor structure 102 that are in direct contact with the filaments 114, and in turn also provides for electrical control of heating and/or cooling of the one or more active adsorbent compounds comprised in or on the cell walls 112 of the structure 102. Accordingly, in such an embodiment, control of electrical current flowing through the filaments 114 of the structure 102 may be used to control heating and cooling of the adsorbent material in or on the cell walls 112 of the structure.

Additionally, it should be noted that for all embodiments described above for use in adsorptive separation systems for implementing the TSA methods according to embodiments of the present invention, the relative dimensions of the parallel fluid flow passages 110, cell walls 112 and axially continuous thermally conductive filaments 114 may be adapted to suit the desired characteristics of the contactor structure 102 for any desired application or use, such as desired characteristics for fluid flow including pressure drop, characteristics for structural integrity and strength, porosity and/or void ratio for the structure 102, thermal capacity and/or mass of the structure, and axial thermal conductivity provided by filaments 114 for example, among other potentially desired characteristics.

In an alternative embodiment of the present invention, a parallel passage adsorbent contactor in the adsorptive separation system may comprise axially thermally conductive means other than axially continuous thermally conductive filaments. In such alternative embodiment, such axially thermally conductive means may comprise discontinuous or randomly oriented thermally conductive elements and/or an axially thermally conductive adsorbent material, for example, which may be operable to transfer heat in a substantially axial direction in the adsorbent contactor structure. In such an alternative embodiment, the present TSA method may then alternatively comprise the step of transferring heat from the heat of adsorption along at least a portion of the alternative axially thermally conductive means in a countercurrent second axial direction which is substantially opposite to the first axial direction of feed fluid being admitted to the adsorbent contactor during the adsorption step. Such alternative embodiment of the TSA method may also comprise the step of transferring heat in substantially either axial direction along at least a portion of the alternative axially thermally conductive means to provide at least a portion of the heat of desorption during the desorption step, for example.

Figure 3:
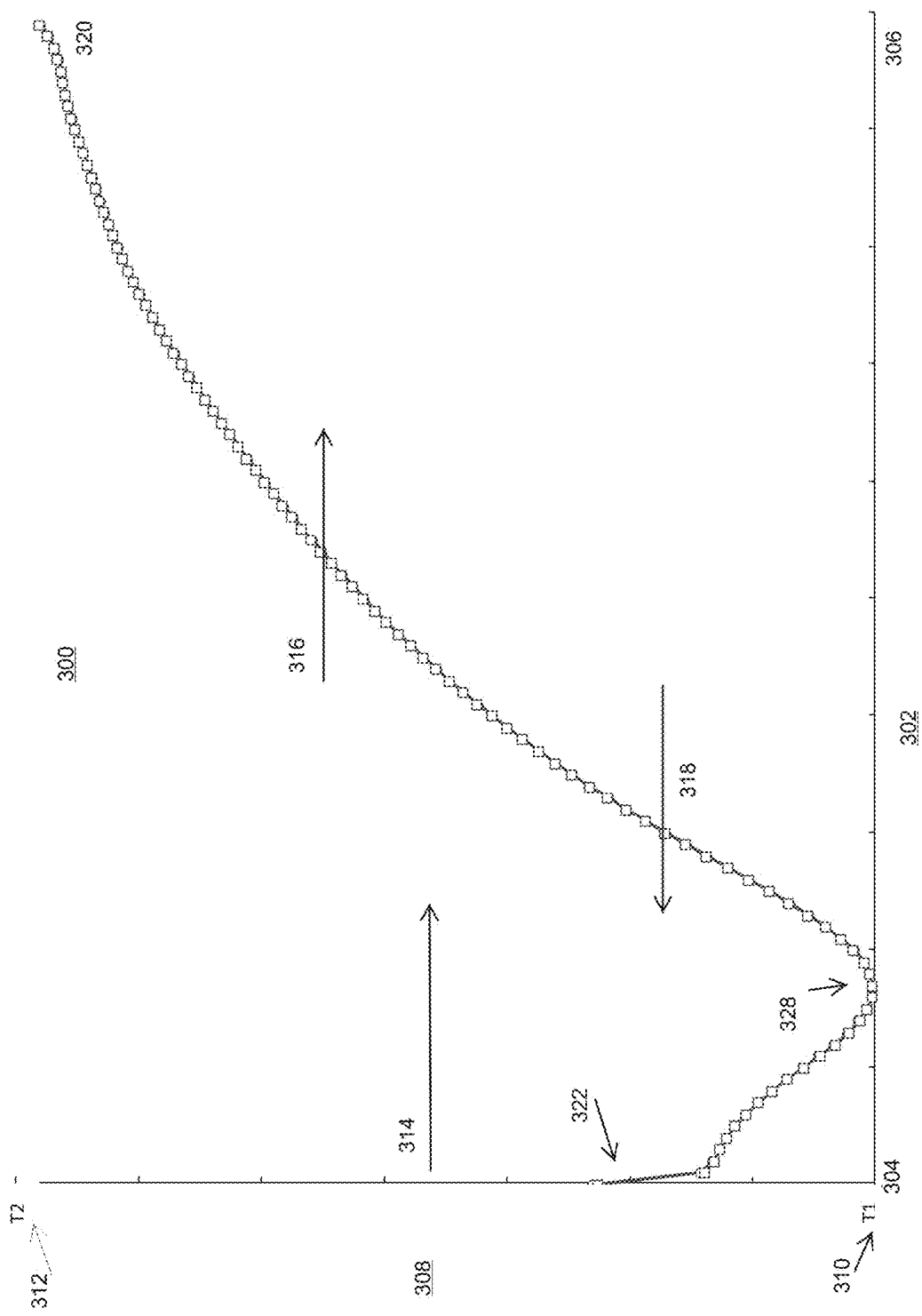
FIG. 3 illustrates an axial thermal profile graph of a parallel passage adsorbent contactor at the start of an adsorption step according to an embodiment of the present invention.

FIG. 3 illustrates an axial thermal profile graph 300 of a parallel passage adsorbent contactor at the start of an adsorption step according to an embodiment of the present invention, showing a plot 320 of the temperature of an adsorbent material in the adsorbent contactor along the axial dimension 302 of the parallel passage adsorbent contactor from the inlet end 304 to the outlet end 306, against the temperature scale 308 of the adsorbent contactor from a lower temperature bound T1 310 to an upper temperature bound T2 312. In the exemplary plot 320, the feed fluid mixture is admitted in a first axial direction 314 flowing from the inlet end 304 towards the outlet end 306 of the parallel passage adsorbent contactor. The temperature of the parallel passage adsorbent contactor at the start of adsorption has begun to rise at the inlet end 304 to reach temperature 322, due to the heat of adsorption released as a first fluid component begins to be adsorbed on the adsorbent material at the leading edge of the thermal front (which together with the mass transfer front comprise the adsorptive front) during the adsorption step of the present TSA method according to an embodiment of the invention. Accordingly, the lowest temperature of the contactor is shown at 328 which is slightly upstream of the inlet end 304. During the adsorption step, heat from the heat of adsorption of the first fluid component on at least one adsorbent material in or on the cell walls of the contactor creates a thermal spike in the parallel passage adsorbent contactor which may undesirably tend to raise the temperature of the adsorbent material and may reduce the adsorptive capacity and hence the effectiveness of the adsorbent material for removing the first fluid component from the feed fluid mixture. A portion of the heat from the heat of adsorption of the first fluid component may be transferred along the contactor towards the outlet end 306 by the effect of convection 316 within the contactor due to the movement of the fluid mixture admitted to the contactor and moving towards the outlet end 306. However, this convection effect 316 may only be effective to transfer heat in the same first axial direction of fluid flow 314 and therefore may act only to increase the temperature of the contactor and adsorbent material towards the outlet end 306.

Accordingly, an embodiment of the present TSA method provides for the transfer of heat from the heat of adsorption of the first fluid component on the adsorbent material in the parallel passage adsorbent contactor along at least a portion of the thermally conductive filaments in the contactor in a second axial direction 318 towards the inlet end 304 of the contactor and opposite to the first axial direction of flow of the feed fluid 314 and corresponding convective heat movement 316 through the adsorbent contactor. Such transfer of heat in the second axial direction 318 by conduction along at least a portion of the thermally conductive filaments in the contactor, and opposite or countercurrent to the flow of feed fluid through the contactor may advantageously reduce the thermal spike in the temperature of the contactor and adsorbent material created by the heat of adsorption as the adsorptive front moves in the first axial direction 314 from the inlet end 304 towards the outlet end 306 of the adsorbent contactor, thereby desirably increasing the adsorptive capacity and hence the effectiveness of the adsorbent material. Further, such countercurrent heat transfer 318 by conduction along at least a portion of thermally conductive filaments in the parallel passage adsorbent contactor may also desirably reduce the amount of thermal energy or heat which may be swept along by convection 316 with the flow of the feed fluid 314 through the contactor and removed from the contactor when the first product fluid leaves the outlet end 306 of the contactor, which would otherwise undesirably increase the required thermal energy or heat required for desorption (including heat of desorption and/or kinetic activation) of the first fluid component from the adsorbent material during a desorption or regeneration step.

FIG. 4 illustrates an axial thermal profile graph 400 of a parallel passage adsorbent contactor during an adsorption step according to an embodiment of the present invention showing a plot 420 of the temperature of an adsorbent material in the adsorbent contactor along the axial dimension 302 of the parallel passage adsorbent contactor from the inlet end 304 to the outlet end 306, against the temperature scale 308 of the adsorbent contactor from a lower temperature bound T1 310 to an upper temperature bound T2 312. In the exemplary plot 420, the feed fluid mixture is being admitted to the contactor in a first axial direction 414 flowing from the inlet end 304 towards the outlet end 306 of the parallel passage adsorbent contactor to be recovered as the first product fluid depleted in the first fluid component, and the leading edge of the adsorptive front 422 has moved axially along the contactor during the adsorption step. The temperature of the parallel passage adsorbent contactor at the leading edge of the thermal front 422 (which along with the mass transfer front comprise the adsorptive front moving through the contactor during adsorption) is higher than at the inlet end of the parallel passage adsorbent contactor 426 as a portion of the heat of adsorption has moved under convection 416 in the first axial direction co-current with the flow of feed fluid mixture 414. However, as provided in the present embodiment of the inventive TSA method, heat from the heat of adsorption of the first fluid component on the adsorbent material is transferred in the second axial direction 424 countercurrent to the flow 414 of feed fluid mixture by conduction along at least a portion of the thermally conductive filaments of the parallel passage adsorbent contactor structure. Such countercurrent heat transfer by conduction is evident in the flow of heat 424 near the inlet end 304 of the contactor near the advancing adsorption front, as well as in the countercurrent flow of heat 418 towards the coolest point of the contactor 428 by conduction along at least a portion of the thermally conductive filaments of the contactor, thereby providing for desirably improved retention of the heat or thermal energy from the heat of adsorption of the first fluid component within the contactor. Since the mass transfer front component of the adsorptive front may typically lag behind the thermal front as adsorption proceeds through the contactor, such countercurrent conduction of heat 418 along at least a portion of the thermally conductive filaments of the contactor may also advantageously allow for progression of the mass transfer front further through the adsorbent contactor towards the outlet end 306 while substantially retaining heat from the thermal front (originating from the heat of adsorption) within the adsorbent contactor, and may therefore desirably increase utilization of the adsorptive capacity of the adsorbent contactor during adsorption, increasing efficiency of the TSA method.

FIG. 5 illustrates an axial thermal profile graph 500 of a parallel passage adsorbent contactor at the conclusion of an adsorption step according to an embodiment of the present invention and the beginning of a desorption step, showing a plot 520 of the temperature of an adsorbent material in the adsorbent contactor along the axial dimension 302 of the parallel passage adsorbent contactor from the inlet end 304 to the outlet end 306, against the temperature scale 308 of the adsorbent contactor from a lower temperature bound T1 310 to an upper temperature bound T2 312. In the exemplary plot 520, the feed fluid mixture is no longer being admitted to the contactor, the first product fluid depleted in the first fluid component is no longer being recovered from the outlet end 306, and a desorption or purge fluid flow 530 is now admitted to the contactor flowing from the outlet end 306 towards the inlet end 304 of the parallel passage adsorbent contactor in the second axial direction. The leading edge of the desorption front 528 is just entering the outlet end 306 of the contactor and will be moving axially along the contactor towards the inlet end 304 during the desorption step. The highest temperature 520 of the parallel passage adsorbent contactor is at the outlet end and decreases towards the edge of the desorption front 528 due to the heat of desorption required to desorb the first fluid component from the adsorbent material during the desorption step. Desirably, an embodiment of the present TSA method provides for transfer of heat by conduction along at least a portion of the axial thermally conductive filaments in the parallel passage adsorbent contactor to provide at least a portion of the heat of desorption and/or kinetic activation required to desorb the first fluid component from the adsorbent material. Such transfer of heat 518 by conduction along the conductive filaments of the contactor is shown in FIG. 5 in the second axial direction or co-current with the flow of desorption or purge fluid 530 towards the inlet end 304 of the contactor. As the desorption front passes through the contactor towards the inlet end 304, the conductive transfer of heat along at least a portion of the thermally conductive filaments of the contactor may be provided in either the first or second axial directions, i.e. co-current or countercurrent to the flow of desorption or purge fluid 530, in order to provide at least a portion of the heat of desorption required to desorb the first fluid component from the adsorbent material. Such heat transfer may also desirably reduce any thermal dip or spike in the temperature of the adsorbent material in the contactor due to the heat of desorption, thereby increasing the effectiveness of the desorption from the adsorbent material and correspondingly increase the capacity of the adsorbent material for subsequent adsorption cycles. In an alternative embodiment including a pre-regeneration purge step as described above, at least a portion of the heat of desorption and/or kinetic activation for an undesired adsorbed second or diluent fluid component adsorbed on the adsorbent material during such pre-regeneration step may also be provided by conductive heat transfer along the thermally conductive filaments of the contactor, for example.

FIG. 6 illustrates an axial thermal profile graph of a parallel passage adsorbent contactor at the conclusion of a desorption or regeneration step according to an embodiment of the present invention showing a plot 620 of the temperature of an adsorbent material in the adsorbent contactor along at least a portion of the axial dimension 302 of the parallel passage adsorbent contactor from the inlet end 304 to the outlet end 306, against the temperature scale 308 of the adsorbent contactor from a lower temperature bound T1 310 to an upper temperature bound T2 312. In the exemplary plot 620, the desorption or purge fluid is no longer being admitted to the contactor and the desorbed product fluid enriched in the first fluid component is no longer being recovered from the inlet end 304, and in one embodiment the contactor may be ready to begin admitting the feed fluid mixture and resuming the adsorption step of the present TSA method. In an alternative embodiment, a conditioning fluid flow 614 may be admitted to the contactor flowing from the inlet end 304 towards the outlet end 306 of the parallel passage adsorbent contactor in the first axial direction, such as to change the temperature of the adsorbent material in the contactor, or to desorb or sweep other fluid components from the contactor prior to beginning the adsorption step of the present TSA method. In one embodiment, the conditioning fluid flow 614 may be admitted to the contactor to lower the temperature of the adsorbent material prior to adsorption, or to dehumidify or otherwise condition the adsorbent material. During such an optional conditioning step, one embodiment of the present TSA method may provide for heat transfer 616 in the first axial direction along the parallel passage adsorbent contactor by means of convection co-current with the flow of conditioning fluid 614. In an alternative embodiment, heat transfer by conduction along at least a portion of the thermally conductive filaments of the contactor may also be provided, which may transfer heat in either the first or second axial direction such as to desirably reduce variations in the temperature of the adsorbent material in the contactor prior to adsorption. Following the end of the desorption or regeneration step (or conditioning step in the case of an alternative embodiment) the highest temperature 620 of the parallel passage adsorbent contactor is at the outlet end and decreases towards the lowest temperature 628 nearest the inlet end 304 of the contactor, in preparation for resumption of the adsorption step of the present TSA method.

In one embodiment of the present invention, adsorption of the first fluid component on the at least one adsorbent material may take place at a first adsorbent material temperature, or a first range of adsorbent material temperatures over the thermal profile of the parallel passage adsorbent contactor, which differs from a second adsorbent material temperature or range of adsorbent material temperatures at which desorption of the first fluid component takes place during a desorbing step. In such an embodiment the adsorbent material may typically be heated to desorb the first fluid component, and therefore the second temperature at which desorption takes place may typically be higher than the first temperature at which adsorption of the first fluid component is performed. In an embodiment of the present invention in which the TSA method comprises an intermediate pre-regeneration step, the pre-regeneration step may comprise desorbing and/or displacing at least a portion of undesirably adsorbed second or diluent fluid component from the adsorbent material, which may be conducted at another intermediate temperature or temperature range, which may preferably be between the first adsorbent material temperature during adsorption, and the second adsorbent material temperature during regeneration or desorption of the first fluid component during a desorbing step. In an embodiment of the present invention in which the TSA method comprises a conditioning step, the conditioning step may comprise conditioning the at least one adsorbent material to a desired pre-adsorption temperature prior to admitting the feed fluid mixture into the contactor for adsorption. In one such embodiment, the conditioning step may comprise admitting at least one conditioning fluid which may comprise a heat transfer fluid into the parallel passage adsorbent contactor to transfer heat to and/or from the adsorbent contactor by direct contact of the conditioning and/or heat transfer fluid with the contactor so as to condition the adsorbent material in the contactor to the desired pre-adsorption temperature. Any suitable known conditioning and/or heat transfer fluids may be used in such a pre-conditioning step, such as but not limited to air, steam, water, coolants, condensable solvents, vapors, etc. In one embodiment, the desired pre-adsorption temperature may typically be lower than the first temperature at which adsorption takes place, however, in an alternative embodiment, the pre-adsorption temperature may be higher than the first adsorption temperature, but lower than the second desorption temperature, for example. In a further related embodiment, such a conditioning step may desirably comprise providing a secondary purge of the adsorbent material in the parallel passage adsorbent contactor, so that following a first purge during the desorption step, a secondary purge fluid stream is passed through the contactor and thereby in contact with the at least one adsorbent material to condition the adsorbent material to a desired pre-adsorption temperature and/or to further desorb or sweep one or more fluid components from the adsorbent material prior to resumption of the next adsorption step in the present TSA method, for example.

In another embodiment of the present invention, the parallel passage adsorbent contactor may comprise at least first and second adsorbent materials, wherein at least a portion of the first fluid component is adsorbed on at least the first adsorbent material during the adsorption step. In one exemplary configuration, the first and second adsorbent materials may be comprised in separate first and second axial segments of the adsorbent contactor with one segment upstream of the other segment in the adsorbent contactor structure. In one such embodiment, where the first adsorbent material adsorbs at least a portion of the first fluid component from the feed fluid mixture, the desorption step of the present TSA method may provide for desorbing at least a portion of the adsorbed first fluid component from the first adsorbent material by heating the first adsorbent material, separate from and substantially without heating the second adsorbent material. In one such embodiment, the thermally conductive filaments in the adsorbent contactor may desirably also be electrically conductive, and such separate heating of the first adsorbent material during the desorption step may be accomplished by applying an electrical current only to the filaments in contact with the first adsorbent material in order to heat the first adsorbent material and desorb the first fluid component therefrom without substantially heating the second adsorbent material.

In another embodiment, the desorption step of the present TSA method may additionally comprise supplying a suitable purge fluid into the parallel passage adsorbent contactor during desorption, and recovering an adsorbed product fluid comprising both the first fluid component and the purge fluid from the contactor. In one such embodiment, the purge fluid may be supplied to at least one of the inlet and outlet ends of the adsorbent contactor during the desorption step and may pass through the parallel passage flow channels in the adsorbent contactor in at least one of the first and second axial directions as part of the desorption of the first fluid component from the at least one adsorbent material. The purge fluid may also be used to provide at least a portion of the heat required to heat the adsorbent material during the desorption step (or an intermediate pre-regeneration step in an alternative embodiment) of the present TSA method. In one aspect, the adsorbent material may be heated during the desorption step by supplying at least one purge or heat transfer fluid at an elevated temperature into the parallel passage fluid contactor. In another embodiment, the desorption step may comprise directly heating at least one adsorbent material to desorb the first fluid component by means of heating the thermally conductive filaments of the contactor and thereby directly heating the cell walls of the parallel passage contactor which comprise the adsorbent material. In one such embodiment, the thermally conductive filaments may be heated by a source of sensible heat, or alternatively in an embodiment where the thermally conductive filaments are also electrically conductive, the filaments, and thereby the adsorbent material in the cell walls of the contactor may be directly heated by passing an electrical current through the filaments such as by electrical resistance or joule heating of the filaments. In a particular aspect, the use of electrical resistance or joule heating of the conductive filaments in the contactor to directly and precisely heat the adsorbent material(s) during desorption may desirably provide for reduced cycle times for the TSA methods of the invention, and may allow for reduction of the conventionally long (typically hours or more) cycle durations to significantly shorter cycle durations such as TSA steps (such as adsorption, desorption, etc.) of less than two minutes, and preferably less than 90 seconds in duration, for example.

In a particular embodiment where the parallel passage contactor also comprises first and second adsorbent materials in corresponding first and second axial segments of the contactor, the desorption step may comprise desorbing at least a portion of the adsorbed first fluid component from the first adsorbent material by electrically heating the conductive filaments in the first axial segment of the contactor separately from the second adsorbent material in the second axial segment. In a further embodiment, the first and second axial segments may be sequentially heated such as by electrical resistance heating of the first and second segments individually during the desorption step of the present TSA method. In one such embodiment, the first axial segment may be located nearest to the outlet end of the contactor and the second axial segment may be located towards the inlet end of the contactor from the first segment, and corresponding to the sequential desorption of the first and second axial segments first and second desorbed product fluids enriched in the first fluid component and another fluid component desorbed from the second adsorbent material may be recovered from the inlet or outlet end (depending upon the direction of fluid flow through the contactor during desorption) during the recovery step of the present TSA method.

According to one embodiment of the present TSA method, any suitable known adsorbent material such as those which may be used to adsorb a desired fluid component of the feed fluid mixture may be used in conjunction with the TSA method as the adsorbent material(s) comprised in and/or on the cell walls of the parallel passage adsorbent contactor(s). In a preferred embodiment, such adsorbent material may desirably provide a sufficiently high dynamic selectivity (such as comprising equilibrium and/or kinetic selectivity) of a first fluid component relative to the remaining components of the feed fluid, over the TSA cycle. In certain embodiments where the contactor(s) utilized in the present TSA method comprise two or more segments or sections, such as two or more axially spaced segments of the parallel passage adsorbent contactors, any suitable known adsorbent materials may be comprised in each of the contactor segments so as to provide for desired adsorption of one or more fluid components from the feed fluid mixture. In one such embodiment, the adsorbent contactor may comprise multiple separate segments or sections comprising the same adsorbent material or combination of adsorbent materials, and in another embodiment, the adsorbent contactor may comprise a different adsorbent material (or combination of adsorbent materials) comprised in each of the contactor segments or sections, such as to selectively adsorb different fluid components of the feed fluid mixture during an adsorption step of the present TSA method. In such cases where multiple different adsorbent materials are implemented in the segments or sections of an adsorbent contactor, desirably the adsorbent materials may be selected so as to be compatible with each other for adsorption of the particular feed fluid components and at the intended adsorption and desorption conditions, for example.

Exemplary known adsorbent materials which may be suitable for use in selected embodiments of the present TSA method may comprise, but are not limited to: desiccant, activated carbon, carbon adsorbent, graphite, carbon molecular sieve, activated alumina, molecular sieve, aluminophosphate, silicoaluminophosphate, zeolite adsorbent, ion exchanged zeolite, hydrophilic zeolite, hydrophobic zeolite, modified zeolite, natural zeolites, faujasite, clinoptilolite, mordenite, metal-exchanged silico-aluminophosphate, unipolar resin, bi-polar resin, aromatic cross-linked polystyrenic matrix, brominated aromatic matrix, methacrylic ester copolymer, graphitic adsorbent, carbon fiber, carbon nanotube, nano-materials, metal salt adsorbent, perchlorate, oxalate, alkaline earth metal particle, ETS, CTS, metal oxide, chemisorbent, amine, organo-metallic reactant, and metal organic framework adsorbent materials, and combinations thereof.

In one embodiment of the TSA method of the present invention, the steps of the TSA method may be desirably conducted under substantially constant or isobaric pressure conditions. In a particular embodiment, the admission of feed fluid to the adsorbent contactor, adsorption of a fluid component, recovery of a first product fluid, desorption of an adsorbed component, and recovery of a desorbed second product fluid may all be conducted under substantially atmospheric pressure, for example. In an alternative embodiment, such steps of the present TSA method may be conducted at a substantially constant elevated pressure, such as under isobaric super-atmospheric conditions, for example. In another alternative embodiment, the admitting, adsorbing and recovering a first product fluid steps of the present TSA method may be conducted under a first substantially constant pressure condition, such as under atmospheric pressure, for example, while the desorbing and recovering a desorbed second product fluid steps may be conducted at an elevated pressure, such as an elevated super-atmospheric pressure. In one such embodiment, the adsorbent contactor may be substantially sealed prior to the desorbing step, and the heating of the adsorbent contactor conducted during the adsorbing step may result in increased pressure within the contactor as the adsorbed fluid component desorbs from the adsorbent material, thereby raising the pressure of the contactor to a super-atmospheric level, for example. In this way the desorbed second product fluid may optionally be recovered at a desirably elevated pressure above the pressure at which the adsorbing steps were conducted, so as to provide a pressurized second product fluid which may be desirable in certain applications.

In a particular aspect according to the present invention, a temperature swing adsorption (TSA) process particularly directed to separating carbon dioxide gas from a flue gas feed mixture comprising at least carbon dioxide and nitrogen components is provided. Such a TSA process for separating carbon dioxide may be particularly adapted for removing at least a portion of carbon dioxide from the flue gas or exhaust of a thermal power plant, such as a coal or natural gas power plant for example. In one embodiment directed to removal of carbon dioxide from a flue gas feed mixture, a temperature swing adsorption (TSA) process is provided for separating at least a carbon dioxide component from the flue gas feed fluid mixture comprising at least carbon dioxide and nitrogen. In such an embodiment, the TSA process may comprise an initial step of admitting the flue gas feed mixture into an adsorptive separation system which comprises at least one parallel passage adsorbent contactor. In particular, suitable such parallel passage adsorbent contactors may comprise a plurality of substantially parallel fluid flow passages oriented in a first axial direction between and inlet and outlet end of the contactor in order to permit fluid to flow through the contactor, and cell walls which comprise at least one carbon dioxide adsorbent material situated between and separating the fluid flow passages. The parallel passage adsorbent contactor may also desirably comprise a plurality of axially continuous thermally conductive filaments oriented in the axial direction of the contactor and in direct contact with the at least one carbon dioxide adsorbent material comprised in or on the cell walls of the contactor. The flue gas may then be admitted into the inlet end of the parallel passage adsorbent contactor to flow in a first axial direction through the contactor towards the outlet end, and at least a portion of the carbon dioxide component may be adsorbed on the at least one carbon dioxide adsorbent material, which may preferably be selective for adsorbing carbon dioxide over nitrogen and/or other components of the flue gas mixture.

In the present embodiment, heat released from the heat of adsorption of the carbon dioxide component on the at least one carbon dioxide adsorbent material is then transferred along at least a portion of the thermally conductive filaments in the adsorbent contactor in a second axial direction (opposite in direction to the first axial direction) back along the contactor towards the inlet end of the contactor during the adsorption of carbon dioxide on the carbon dioxide adsorbent material. Such transfer of heat in the second axial direction may desirably reduce a spike in the temperature of the at least one carbon dioxide adsorbent as adsorption of carbon dioxide occurs, and optionally also desirably retain at least a significant portion of the heat energy from the heat of adsorption within the adsorbent contactor to allow recovery of such thermal energy during later regeneration of the carbon dioxide adsorbent material. A flue gas product stream depleted in carbon dioxide relative to the flue gas feed mixture is then recovered from the outlet end of the adsorbent contactor. In embodiments directed to removing carbon dioxide from thermal power plant flue gas, such first product fluid may desirably comprise a substantially carbon dioxide-free flue gas product stream, which may then be vented to atmosphere or otherwise treated or processed prior to release and which may therefore be expected to have a significantly lessened impact on carbon emissions due to the removal of carbon dioxide, as may be desirable for reducing impact on atmospheric carbon dioxide levels for example. Following such recovery of the flue gas product stream, at least a portion of the carbon dioxide adsorbed on the at least one carbon dioxide adsorbent material is then desorbed by heating the at least one adsorbent material, and heat is transferred in either of the first or second axial directions along at least a portion of the thermally conductive filaments of the adsorbent contactor to provide at least a portion of the heat of desorption of the carbon dioxide from the adsorbent material which is required during the desorption step. Finally, a desorbed carbon dioxide product enriched in carbon dioxide is recovered from at least one of the inlet and outlet ends of the parallel passage adsorbent contactor.

The present TSA carbon dioxide separation process according to the above embodiment may then optionally be repeated in the parallel passage adsorbent contactor to provide for a continuous or repeated cyclic separation method for separating carbon dioxide from the flue gas feed mixture. In particular, similar to as described above in other embodiments, an adsorptive separation system for operation according to the present TSA carbon dioxide separation process may desirably comprise two or more such parallel passage adsorbent contactors, so as to provide for staggered operation of the present TSA separation process and allow continuous and/or semi-continuous adsorptive separation from a source of flue gas such as a thermal power plant, for example. As described above, any suitable known adsorptive separation system using mechanical/pneumatic or other types of valves or other flow control devices for example may be used to implement the gas flows of the steps of the present TSA process, as are known in the art for systems comprising one, two, or three or more adsorbers containing adsorbent material.

Similar to as described above, in one embodiment of the present invention, an adsorptive separation system suitable for implementing the carbon dioxide separation process comprises at least one parallel passage adsorbent contactor which each comprise a plurality of substantially parallel fluid flow passages oriented in a first axial direction between and inlet and outlet end of the contactor in order to permit gas to flow through the contactor, and cell walls which comprise at least one carbon dioxide selective adsorbent material situated between and separating the fluid flow passages. Each suitable such parallel passage adsorbent contactor further comprises a plurality of axially continuous thermally conductive filaments oriented in the axial direction of the contactor and in direct contact with the at least one carbon dioxide adsorbent material comprised in the cell walls of the contactor. As described above, certain such parallel passage adsorbent contactor structures which may be suitable for use in implementing the TSA carbon dioxide separation process according to an embodiment of the present invention are described in the applicant's co-pending PCT International patent application filed as PCT/CA2010/000251, the contents of which are herein incorporated by reference as though they had formed part of this application as originally filed. One particular parallel passage adsorbent contactor configuration suitable for implementation of the TSA carbon dioxide separation process according to an embodiment of the present invention is shown in FIGS. 1 and 2 as described above. In an optional embodiment, suitable parallel passage adsorbent contactors may comprise a plurality of continuous or substantially continuous thermally (and/or electrically) conductive filaments oriented at least one of the axial direction (parallel to the direction of fluid flow through the adsorbent contactor) and transverse direction (transverse relative to the axial direction).

In one embodiment, the TSA carbon dioxide separation process may also comprise a conditioning step to condition at least one carbon dioxide adsorbent in the adsorbent contactor(s) to a desired pre-adsorption temperature prior to admitting the flue gas feed mixture and adsorption of carbon dioxide. Similar to as described above in other embodiments, such a conditioning step may comprise conditioning at least one carbon dioxide adsorbent material to any desired or suitable pre-adsorption temperature, such as a temperature lower than an adsorption temperature of the carbon dioxide adsorbent during an adsorption step of the TSA process, or higher than the adsorption temperature but lower than a desorption temperature of the adsorbent during a desorption step of the TSA process, for example. Also, similar to as described above, the adsorption temperature of the carbon dioxide adsorbent may desirably be lower than the desorption temperature during a desorption step, such that the desorption of carbon dioxide from the adsorbent may be accomplished by heating the adsorbent material, such as by direct heating of the thermally conductive filaments in the adsorbent contactor, for example.

In a particular embodiment, the TSA carbon dioxide separation process may be applied to separate carbon dioxide from the flue gas from a thermal power plant such as a coal fired boiler flue gas, so as to desirably substantially remove the carbon dioxide from the flue gas to allow capture of the carbon dioxide and thereby significantly decrease carbon emissions of the power plant. In one such embodiment, the coal fired boiler flue gas feed mixture may comprise approximately 12% carbon dioxide, 84% nitrogen and oxygen, and 4% water vapor, and may be supplied at approximately atmospheric pressure (101.3 kPa) and at a temperature of about 40 C, for example. In such a case, a suitable carbon dioxide adsorbent material may be used in the parallel passage adsorbent contactor(s) of the adsorptive separation system to adsorb substantially all of the carbon dioxide from the flue gas during the adsorption step of the TSA process, and to recover a substantially carbon dioxide-free flue gas product stream.

In a preferred embodiment of the present invention, at least one carbon dioxide selective adsorbent material comprised in the parallel passage adsorbent contactor may desirably be dynamically selective for adsorption of carbon dioxide over nitrogen or other diluent components of the flue gas mixture, such that a dynamic selectivity for carbon dioxide is sufficiently high to usably provide substantially complete carbon dioxide separation. Such dynamic selectivity over the cycle of the TSA separation method may comprise at least one of an equilibrium selectivity of the at least one adsorbent material for carbon dioxide, and a kinetic selectivity of the at least one adsorbent material for carbon dioxide. In one such preferred embodiment, the flue gas mixture may be admitted to the adsorbent contactor at a space velocity (Vgas/Vads/t) less than the mass transfer rate (1/s) of carbon dioxide, but greater than the mass transfer rate (1/s) of nitrogen or other diluent components, such that the adsorption step may comprise at least a kinetic selectivity based on the mass transfer rates of carbon dioxide and nitrogen on the adsorbent material at the adsorbent temperature during the adsorption step.

In the desorption step of the TSA process, a steam purge gas may be supplied to the adsorbent contactor, such as from the outlet end, and such as at a temperature of about 130 C and pressure of about 105 kPa, to assist in desorption along with the heating of the adsorbent with the thermally conductive filaments in the contactor. In one such case, as carbon dioxide is desorbed from the adsorbent material during the desorption step, a portion of the steam purge gas may be adsorbed by the adsorbent material which may release heat due to the heat of adsorption of the steam, which heat may also be transferred axially along the contactor by the thermally conductive filaments, which may desirably further provide a portion of the heat of desorption necessary for continued desorption of carbon dioxide. The recovered carbon dioxide product from the adsorbent contactor may desirably be highly concentrated in carbon dioxide such as to allow for compression, storage, sequestration, or alternative industrial use (such as for injection use in enhanced oil recovery for example) of the carbon dioxide removed from the flue gas. In one such embodiment, the steam component of the recovered carbon dioxide product stream may desirably be condensed in order to remove it from the product stream, thereby resulting in increased purity of the carbon dioxide product. In another embodiment, the purge gas may also comprise at least one of ambient air, steam, and a flue gas product stream depleted of carbon dioxide. In yet another embodiment, a heat transfer fluid may also be admitted to the contactor during the desorption step, such as at an elevated temperature to heat the adsorbent material, and may be used in addition to or in place of a purge gas. Such heat transfer fluid may comprise at least one of ambient air, steam, a carbon dioxide enriched product gas, or a flue gas product stream depleted of carbon dioxide, for example. In a particular embodiment, the carbon dioxide adsorbent material may also be directly heated by heating the thermally conductive filaments in the adsorbent contactor, such as by applying sensible heat to the filaments, or in the case of electrically conductive filaments, applying an electrical current to directly heat the filaments by electrical resistance or joule heating. In an alternative embodiment, a steam purge gas (or optionally another suitable purge gas or fluid or heat transfer fluid), may alternatively be admitted from the inlet end or another location along the parallel passage contactor so as to provide for flow of purge gas in the same direction as the feed fluid, opposite to the feed fluid direction, or both, for example.

In an alternative embodiment, as may be particularly desirable in applications to separate carbon dioxide from flue gas streams having relatively dilute carbon dioxide concentrations such as less than about 10% and more particularly less than about 5%, the TSA process may additionally comprise an intermediate recycle or pre-regeneration step in which a limited amount of heat is provided to the adsorbent material to heat the contactor to an intermediate temperature sufficient to desorb at least a portion of an undesired nitrogen (or other diluent) component co-adsorbed on the adsorbent material. In such case, the adsorbent material may be heated using any suitable means, such as one or more of: providing a heated purge gas, heated recycle gas or heated carbon dioxide product gas to the adsorbent contactor, and/or direct or electrically heating the conductive filaments in the adsorbent contactor, for example. The resulting recycle stream leaving the adsorbent contactor during such step may then be recycled within the TSA process such as to provide heat for another desorption or pre-regeneration step and/or recycled to the feed stream for re-admission during subsequent adsorption or feed steps. In an alternative embodiment, during such an intermediate recycle or pre-regeneration step, a heated purge gas, recycle gas or carbon dioxide product gas (such as steam or optionally another suitable purge gas or fluid or heat transfer fluid), may alternatively be admitted from the inlet end or another location along the parallel passage contactor so as to provide for flow of heated pre-regeneration fluid in the same direction as the feed fluid, opposite to the feed fluid direction, or both, for example.

Following the recovery of the carbon dioxide product, the present TSA process may also comprise a conditioning step where ambient air at less than about 40 C and at substantially atmospheric pressure (101.3 kPa) may be admitted at the inlet end of the contactor, to condition the adsorbent material prior to resuming the adsorption step on the next cycle. The conditioning step may desirably cool the adsorbent material by removal of sensible heat from the adsorbent material by the ambient air, and also to remove at least a portion of the water adsorbed on the adsorbent material from the steam purge gas, thereby drying the adsorbent material prior to the next adsorption step, and also further cooling the adsorbent material due to the heat removed by desorption of the water from the adsorbent material during drying. However, in some embodiments, such cooling step using air as a cooling fluid may result in adsorption of at least a portion of nitrogen or other diluents on the adsorbent material, thereby necessitating the above-described pre-regeneration or recycle step in order to preserve high purity in the desorbed carbon dioxide product recovered during the regeneration of the adsorbent contactor, as may be desirable for carbon sequestration, compression and/or enhanced oil recovery injection of carbon dioxide applications.

In certain embodiments of the present TSA carbon dioxide separation process, any suitable known carbon dioxide adsorbent material may be used in the parallel passage adsorbent contactor(s) of the adsorptive separation system to adsorb carbon dioxide during the adsorption step of the process. Potentially suitable such carbon dioxide adsorbents may comprise, but are not limited to: activated carbon adsorbent, amine impregnated adsorbent supports (comprising silica, activated carbon, carbon molecular sieve, alumina, zeolite, polymer and ceramic supports), metal salt, metal hydroxide, metal oxide, zeolite, hydrotalcite, silicalite, metal organic framework and zeolitic imadazolate framework adsorbent materials, and combinations thereof. In a particular embodiment, a suitable carbon dioxide adsorbent material may be selected that may also desirably be selective for the adsorption of carbon dioxide over any other gas components of the flue gas feed mixture, for example. In a particular embodiment, such suitable carbon dioxide selective adsorbent material may desirably be tailored for high dynamic selectivity of carbon dioxide over nitrogen. Such desirable high dynamic selectivity carbon dioxide adsorbent may thereby be chosen so as to maximize equilibrium and kinetic selectivity for carbon dioxide over nitrogen (and/or other diluents fluid species) in a cyclic TSA process by either selecting an adsorbent with such characteristics or tailoring the properties of the parallel passage contactor and/or modifying the surface characteristics of adsorbent material comprised in the parallel passage contactor such as by modifying the adsorbent material pore size, pore throat, pocket size, etc., to improve equilibrium and/or kinetic selectivity of carbon dioxide, for example.

Similar to as described above in other embodiments, in one embodiment of the present TSA carbon dioxide separation process, the adsorbent contactor may comprise at least one first carbon dioxide adsorbent and also at least one second adsorbent material. Such first and second adsorbent materials may comprise similar or different adsorbent materials and may be comprised in first and second segments of the adsorbent contactor, such as first and second axial segments for example. In such a case the desorption step of the TSA carbon dioxide separation process may comprise desorbing at least a portion of the adsorbed carbon dioxide from the first adsorbent material by electrically heating the conductive filaments in the first axial segment of the contactor separately from the second adsorbent material in the second axial segment. In a further embodiment, the first and second axial segments may be sequentially heated such as by electrical resistance heating of the first and second segments individually during the desorption step of the present TSA method, so as to produce a separate first carbon dioxide rich product gas, and a second product gas enriched in another flue gas component desorbed from the second adsorbent material. In one such embodiment, the first axial segment may be located nearest to the outlet end of the contactor and the second axial segment may be located towards the inlet end of the contactor from the first segment, and corresponding to the sequential desorption of the first and second axial segments first and second desorbed product fluids enriched in carbon dioxide and another flue gas component desorbed from the second adsorbent material may be recovered from the inlet or outlet end (depending upon the direction of fluid flow through the contactor during desorption) during the recovery step of the present TSA method. In another embodiment, three or more axial segments and corresponding adsorbent materials may be implemented including the first carbon dioxide adsorbent, and may thereby be sequentially and individually desorbed in order to produce a separate carbon dioxide enriched product streams and corresponding other product streams which may be recovered separately from the adsorbent contactor. In a particular embodiment, a second adsorbent material selective for at least one of water, nitrogen oxides, sulfur oxides and heavy metals over carbon dioxide, respectively, and optionally also a third adsorbent material selective for at least one of water, nitrogen oxides, sulfur oxides and heavy metals over carbon dioxide may be implemented in separate second and third axial segments in addition to the carbon dioxide adsorbent in a first axial segment of the contactor, such that the second axial segment is located upstream of said first axial segment nearer to the inlet end of said contactor, and wherein said third axial segment is located upstream of said first axial segment and downstream of said second axial segment. Such second and third adsorbent materials may thereby be used to desirably separate other contaminants from the flue gas stream which may be separately desorbed and recovered such as for containment and/or disposal separate from the carbon dioxide product.

Similar to as described above in other embodiments, in one embodiment of the present TSA carbon dioxide separation process, the steps of the TSA process may be desirably conducted under substantially constant or isobaric pressure conditions. In a particular embodiment, the admission of the flue gas feed mixture to the adsorbent contactor, adsorption of carbon dioxide, recovery of a flue gas product stream, desorption of carbon dioxide, and recovery of a desorbed carbon dioxide stream may all be conducted under substantially atmospheric pressure, for example. In an alternative embodiment, such steps of the present TSA process may be conducted at a substantially constant elevated pressure, such as under isobaric super-atmospheric conditions, for example. In another alternative embodiment, the admitting, adsorbing and recovering a flue gas product stream steps of the present TSA process may be conducted under a first substantially constant pressure condition, such as under atmospheric pressure, for example, while the desorbing and recovering a desorbed carbon dioxide product steps may be conducted at an elevated pressure, such as an elevated super-atmospheric pressure. In one such embodiment, the adsorbent contactor may be substantially sealed prior to the desorbing step, and the heating of the adsorbent contactor conducted during the adsorbing step may result in increased pressure within the contactor as the adsorbed carbon dioxide desorbs from the adsorbent material, thereby raising the pressure of the contactor to a super-atmospheric level, for example. In this way the desorbed carbon dioxide product fluid may optionally be recovered at a desirably elevated pressure above the pressure at which the adsorbing steps were conducted, so as to provide a pressurized carbon dioxide product stream which may be desirable in certain applications, such as where further compression of the carbon dioxide may be required for transport, storage, sequestration or industrial use.

In another aspect of the present invention, the temperature swing adsorption (TSA) carbon dioxide separation process may be particularly directed to separating carbon dioxide gas from a natural gas feed mixture in place of a flue gas feed mixture. In such embodiments, the natural gas feed mixture may comprise at least methane and carbon dioxide components, and may also comprise hydrogen sulfide or other contaminants. Such a TSA process for separating carbon dioxide from natural gas may be particularly adapted for removing at least a portion of the carbon dioxide and/or hydrogen sulfide from a contaminated natural gas feed mixture, as may be encountered in applications such as shale gas, low concentration natural gas fields or end of well life natural gas sources, for example. In such cases, the TSA carbon dioxide separation process may be relatively similar to that for flue gas separation, substituting the natural gas feed stream for the flue gas. Any suitable adsorbent material may be comprised in the adsorbent contactor(s) of the adsorptive separation system which are desirably selective for carbon dioxide and/or hydrogen sulfide over other natural gas components, and preferably desirably dynamically selective (comprising equilibrium and/or kinetic selectivity) for carbon dioxide and/or hydrogen sulfide (or other undesirable diluent components) over methane over the cyclic TSA process. In a particular embodiment, such suitable carbon dioxide selective adsorbent material may desirably be tailored for high dynamic selectivity of carbon dioxide over methane. Such desirable high dynamic selectivity carbon dioxide adsorbent may thereby be chosen so as to maximize equilibrium and kinetic selectivity for carbon dioxide over methane in a cyclic TSA process by either selecting an adsorbent with such characteristics or tailoring the properties of the parallel passage contactor and/or modifying the surface characteristics of adsorbent material comprised in the parallel passage contactor such as by modifying the adsorbent material pore size, pore throat, pocket size, etc., to improve equilibrium and/or kinetic selectivity of carbon dioxide, for example. Also, such natural gas carbon dioxide separation processes may typically be conducted at isobaric super-atmospheric pressures associated with pressurized natural gas feed mixture sources such as wells and/or pipelines, for example.

The exemplary embodiments herein described are not intended to be exhaustive or to limit the scope of the invention to the precise forms disclosed. They are chosen and described to explain the principles of the invention and its application and practical use to allow others skilled in the art to comprehend its teachings.

As will be apparent to those skilled in the art in light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An adsorption method for separating a fluid mixture comprising at least first and second fluid components, the method comprising:
    admitting said fluid mixture into an adsorptive separation system comprising at least one parallel passage adsorbent contactor, said parallel passage adsorbent contactor comprising a first axial direction between an inlet and an outlet end thereof and comprising at least one adsorbent material;
    admitting said fluid mixture into said inlet end of said parallel passage adsorbent contactor to flow towards said outlet end in said first axial direction;
    adsorbing at least a portion of said first fluid component on said at least one adsorbent material;
    transferring heat from a heat of adsorption of said first fluid component on said at least one adsorbent material along said parallel passage adsorbent contactor in an axial direction during said adsorbing step;
    recovering a first product fluid depleted in said first fluid component relative to said fluid mixture from said outlet end;
    admitting a purge fluid into said parallel passage adsorbent contactor to flow in a second axial direction;
    transferring said heat of adsorption along said parallel passage adsorbent contactor in said second axial direction to provide at least a portion of a heat of desorption for desorbing said first fluid component from said adsorbent material; and
    desorbing at least a portion of said first fluid component adsorbed on at least one said adsorbent material by heating at least one said adsorbent material; and
    recovering a desorbed second product fluid enriched in said first fluid component from at least one of said inlet and said outlet ends,
    wherein the steps of admitting a purge fluid into said parallel passage adsorbent contactor, transferring said heat of adsorption along said parallel passage adsorbent contactor, and desorbing at least a portion of said first fluid component occur substantially simultaneously.

2. The adsorption method according to claim 1, additionally comprising admitting a pre-regeneration fluid into said parallel passage adsorbent contactor and desorbing at least a portion of said second fluid component co-adsorbed on said at least one adsorbent material by heating said at least one adsorbent material to a pre-regeneration temperature, prior to admitting said purge fluid.

3. The adsorption method according to claim 2, additionally comprising admitting said pre-regeneration fluid into said parallel passage adsorbent contactor to flow towards said inlet end in a second axial direction.

4. The adsorption method according to claim 1, wherein said at least one adsorbent material is kinetically selective for said first fluid component and has a first mass transfer rate for said first fluid component which is greater than a second mass transfer rate for said second fluid component.

5. The adsorption method according to claim 4, wherein admitting said fluid mixture comprises admitting said fluid mixture into said inlet end of said parallel passage adsorbent contactor to flow towards said outlet end in said first axial direction wherein said fluid mixture is admitted at a space velocity greater than said second mass transfer rate for said second fluid component and less than said first mass transfer rate for said first fluid component.

6. The adsorption method according to claim 1, additionally comprising conditioning at least one said adsorbent material to a desired pre-adsorption temperature prior to admitting said fluid mixture into said parallel passage adsorbent contactor.

7. The adsorption method according to claim 1 wherein said parallel passage adsorbent contactor comprises at least first and second adsorbent materials, and wherein said desorbing comprises desorbing at least a portion of said first fluid component adsorbed on said first adsorbent material by heating said first adsorbent material separately from said second adsorbent material.

8. The adsorption method according to claim 1, wherein said purge fluid is condensable, and additionally comprising condensing said purge fluid out of said desorbed product fluid following recovering said desorbed product fluid.

9. The adsorption method according to claim 1, wherein said desorbing additionally comprises heating at least one said adsorbent material by supplying at least one heat transfer fluid at an elevated temperature into said parallel passage adsorbent contactor.

10. The adsorption method according to claim 1, wherein said desorbing additionally comprises directly heating at least one said adsorbent material by supplying thermal energy to a plurality of contactor cell walls comprising said at least one adsorbent material.

11. The adsorption method according to claim 6, wherein said conditioning further comprises providing a secondary purge of said at least one adsorbent material prior to admitting said fluid mixture.

12. The adsorption method according to claim 1, wherein said transferring said heat of adsorption along at least a portion of said contactor during said adsorbing step is effective to reduce a thermal profile spike in said parallel passage adsorbent contactor associated with said adsorbing of said first fluid component on said at least one adsorbent material.

13. The adsorption method according to claim 1, wherein said at least one adsorbent material is selected from the list consisting of: desiccant, activated carbon, carbon molecular sieve, carbon adsorbent, graphite, activated alumina, molecular sieve, aluminophosphate, silicoaluminophosphate, zeolite adsorbent, ion exchanged zeolite, hydrophilic zeolite, hydrophobic zeolite, modified zeolite, natural zeolites, faujasite, clinoptilolite, mordenite, metal-exchanged silico-aluminophosphate, uni-polar resin, bi-polar resin, aromatic cross-linked polystyrenic matrix, brominated aromatic matrix, methacrylic ester copolymer, graphitic adsorbent, carbon fiber, carbon nanotube, nano-materials, metal salt adsorbent, perchlorate, oxalate, alkaline earth metal particle, ETS, CTS, metal oxide, chemisorbent, amine, organo-metallic reactant, and metal organic framework adsorbent materials, and combinations thereof.

14. The adsorption method according to claim 1, wherein said admitting, adsorbing, recovering a first product fluid, desorbing and recovering a desorbed second product fluid steps are substantially isobaric and are conducted at one of substantially atmospheric and elevated supra-atmospheric pressures.

15. The adsorption method according to claim 1, wherein said fluid mixture comprises a flue gas, said first fluid component comprises carbon dioxide, and said second fluid component comprises nitrogen, and wherein said at least one adsorbent material comprises at least one carbon dioxide adsorbent material.

16. The adsorption process according to claim 15, wherein said parallel passage adsorbent contactor comprises at least first and second axial segments comprising a first adsorbent material selective for carbon dioxide over nitrogen, and a second adsorbent material selective for at least one of water, nitrogen oxides, sulfur oxides and heavy metals over carbon dioxide, respectively, and wherein said second axial segment is located upstream of said first axial segment nearer to the inlet end of said contactor.

17. The adsorption method according to claim 1, additionally comprising admitting at least one heat transfer fluid into said parallel passage adsorbent contactor to flow towards said inlet end in said first axial direction.

18. The adsorption method according to claim 1, additionally comprising transferring said heat of adsorption in a transverse direction relative to said first axial direction.

19. The adsorption method according to claim 1, further comprising:
   during said adsorbing step, flowing a thermal front towards said outlet end of said adsorbent contactor; and
   admitting said purge fluid into said parallel passage adsorbent contactor prior to said thermal front exiting from said outlet end of said adsorbent contactor.

20. An adsorption process for separating at least one of carbon dioxide and hydrogen sulfide from a natural gas feed mixture comprising at least one of carbon dioxide and hydrogen sulfide and methane components, the process comprising:
   admitting said natural gas feed mixture into an adsorptive separation system comprising at least one parallel passage adsorbent contactor, said parallel passage adsorbent contactor comprising a first axial direction between an inlet and an outlet end thereof and at least one adsorbent material;
   admitting said natural gas feed mixture into said inlet end of said parallel passage adsorbent contactor to flow towards said outlet end in said first axial direction;
   adsorbing at least a portion of at least one of said carbon dioxide and hydrogen sulfide components on said at least one adsorbent material;
   transferring heat from a heat of adsorption on said at least one adsorbent material along at least a portion of said parallel passage adsorbent contactor in an axial direction during said adsorbing step;
   recovering a natural gas product stream depleted in at least one of carbon dioxide and hydrogen sulfide relative to said natural gas feed mixture from said outlet end;
   admitting a purge fluid into said parallel passage adsorbent contactor to flow towards said inlet end in a second axial direction;
   desorbing at least a portion of at least one of said carbon dioxide and hydrogen sulfide adsorbed on at least one said adsorbent material by heating said at least one adsorbent material;
   transferring said heat of adsorption along at least a portion of said parallel passage adsorbent contactor in said second axial direction to provide at least a portion of the heat of desorption of said carbon dioxide or hydrogen sulfide during said desorbing step; and
   recovering a desorbed product enriched in at least one of carbon dioxide and hydrogen sulfide from at least one of said inlet and said outlet ends.

21. The adsorption method according to claim 20, additionally comprising transferring said heat of adsorption in a transverse direction relative to said first axial direction.

* * * * *